United States Patent
Maruyama

(10) Patent No.: US 9,553,731 B2
(45) Date of Patent: Jan. 24, 2017

(54) TRANSMISSION METHOD AND SYSTEM FOR TERMINAL UNIQUE INFORMATION

(71) Applicant: FUJITSU LIMITED, Kawasaki-shi, Kanagawa (JP)

(72) Inventor: Hidefumi Maruyama, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 14/333,574

(22) Filed: Jul. 17, 2014

(65) Prior Publication Data

US 2014/0331053 A1    Nov. 6, 2014

Related U.S. Application Data

(63) Continuation of application No. PCT/JP2012/052560, filed on Feb. 3, 2012.

(51) Int. Cl.
  *H04L 9/32* (2006.01)
  *H04N 5/913* (2006.01)
  (Continued)

(52) U.S. Cl.
  CPC .......... *H04L 9/3268* (2013.01); *H04L 9/0825* (2013.01); *H04N 5/913* (2013.01);
  (Continued)

(58) Field of Classification Search
  CPC ..... H04L 9/3268; H04L 9/0825; H04N 5/913; H04N 21/2585; H04N 21/63345; H04N 21/63775; H04N 2005/91364
  See application file for complete search history.

(56) References Cited

U.S. PATENT DOCUMENTS

| 6,868,404 B1 | 3/2005 | Ono et al. |
| 2002/0073310 A1* | 6/2002 | Benantar ............... H04L 9/3268 713/156 |

(Continued)

FOREIGN PATENT DOCUMENTS

| EP | 2001155 A2 | 12/2008 |
| JP | 2001-60945 A | 3/2001 |

(Continued)

OTHER PUBLICATIONS

International Search Report, mailed in connection with PCT/JP2012/052560 and mailed Apr. 3, 2012.

(Continued)

*Primary Examiner* — Linglan Edwards
*Assistant Examiner* — Forrest Carey
(74) *Attorney, Agent, or Firm* — Fujitsu Patent Center

(57) ABSTRACT

A terminal unique information transmission method including: receiving, by a server, from a terminal, a terminal unique information acquisition request including a terminal unique public key certificate of the terminal; generating an encrypted terminal unique public key certificate by encrypting the terminal unique public key certificate of the terminal; checking, by the server, whether the generated encrypted terminal unique public key certificate is described in a discarded terminal information table; and transmitting, by the server, when the generated encrypted terminal unique public key certificate is not described in the discarded terminal information table, a terminal unique information of the terminal to the terminal.

10 Claims, 23 Drawing Sheets

(51) Int. Cl.
  *H04N 21/6334* (2011.01)
  *H04N 21/6377* (2011.01)
  *H04L 9/08* (2006.01)
  *H04N 21/258* (2011.01)

(52) U.S. Cl.
  CPC ... *H04N 21/2585* (2013.01); *H04N 21/63345* (2013.01); *H04N 21/63775* (2013.01); *H04N 2005/91364* (2013.01)

(56) References Cited

U.S. PATENT DOCUMENTS

| | | |
|---|---|---|
| 2002/0164035 A1 | 11/2002 | Yokota et al. |
| 2004/0024981 A1 | 2/2004 | Iwatsu et al. |
| 2006/0150257 A1* | 7/2006 | Leung .................... G06F 21/10 726/27 |
| 2007/0180497 A1 | 8/2007 | Popescu et al. |
| 2008/0294894 A1 | 11/2008 | Dubhashi et al. |
| 2009/0327702 A1* | 12/2009 | Schnell .................. G06F 21/10 713/155 |
| 2010/0299522 A1 | 11/2010 | Khambete |

FOREIGN PATENT DOCUMENTS

| | | |
|---|---|---|
| JP | 2002-374240 A | 12/2002 |
| JP | 2010-220093 A | 9/2010 |
| WO | 03/005208 A1 | 1/2003 |
| WO | 2005/088896 A1 | 9/2005 |

OTHER PUBLICATIONS

Notification of Transmittal of Translation of The International Preliminary Report on Patentability (Form PCT/IB/338, Form PCT/IB/373 & Form PCT/ISA/237), PCT/JP2012/052560, 6 pages, dated Aug. 14, 2014.

EESR—Extended European Search Report dated Jun. 18, 2015 for corresponding European application No. 12867236.7, 7 pages.

* cited by examiner

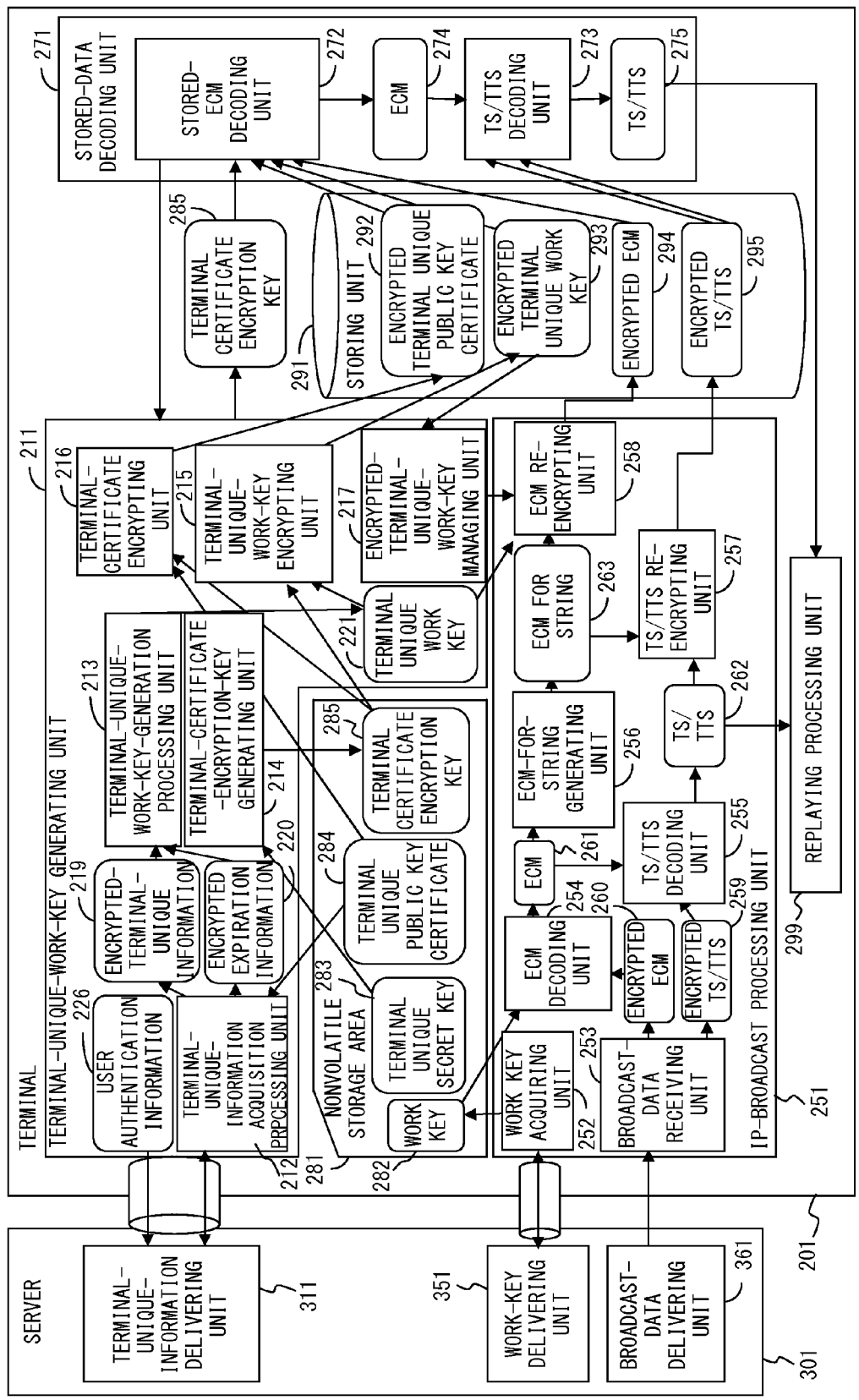
F I G. 2

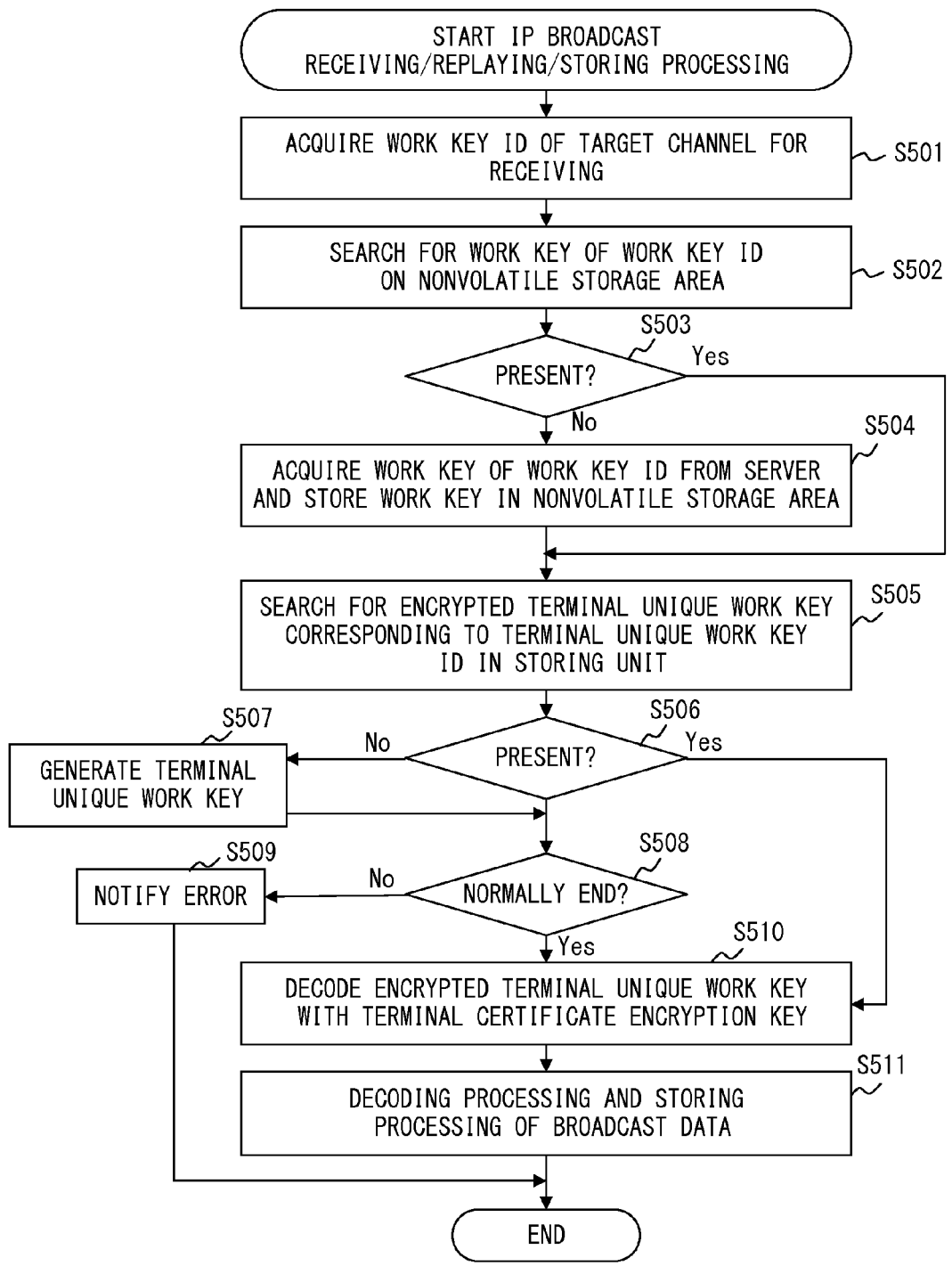
F I G. 3

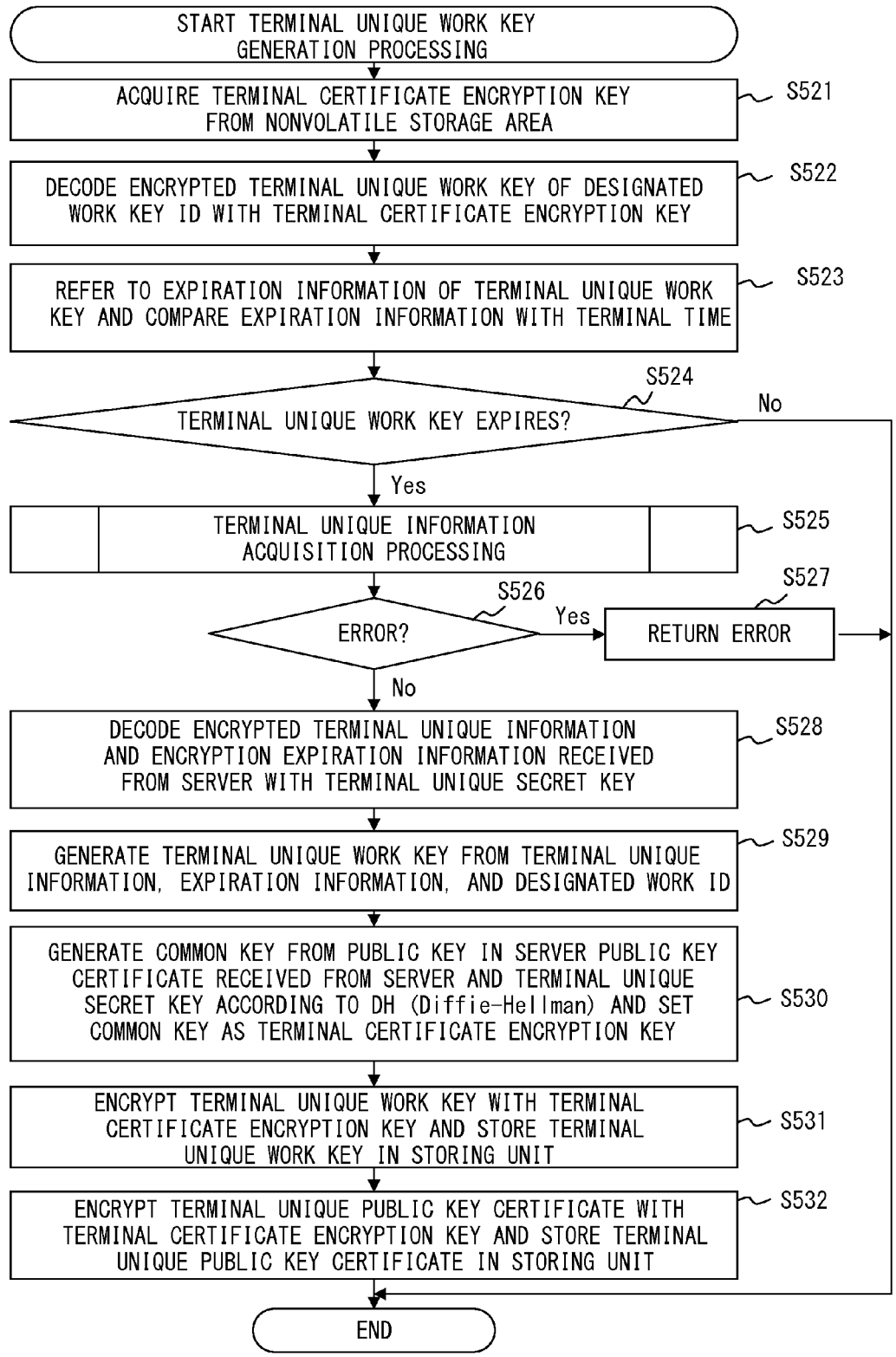
F I G. 4

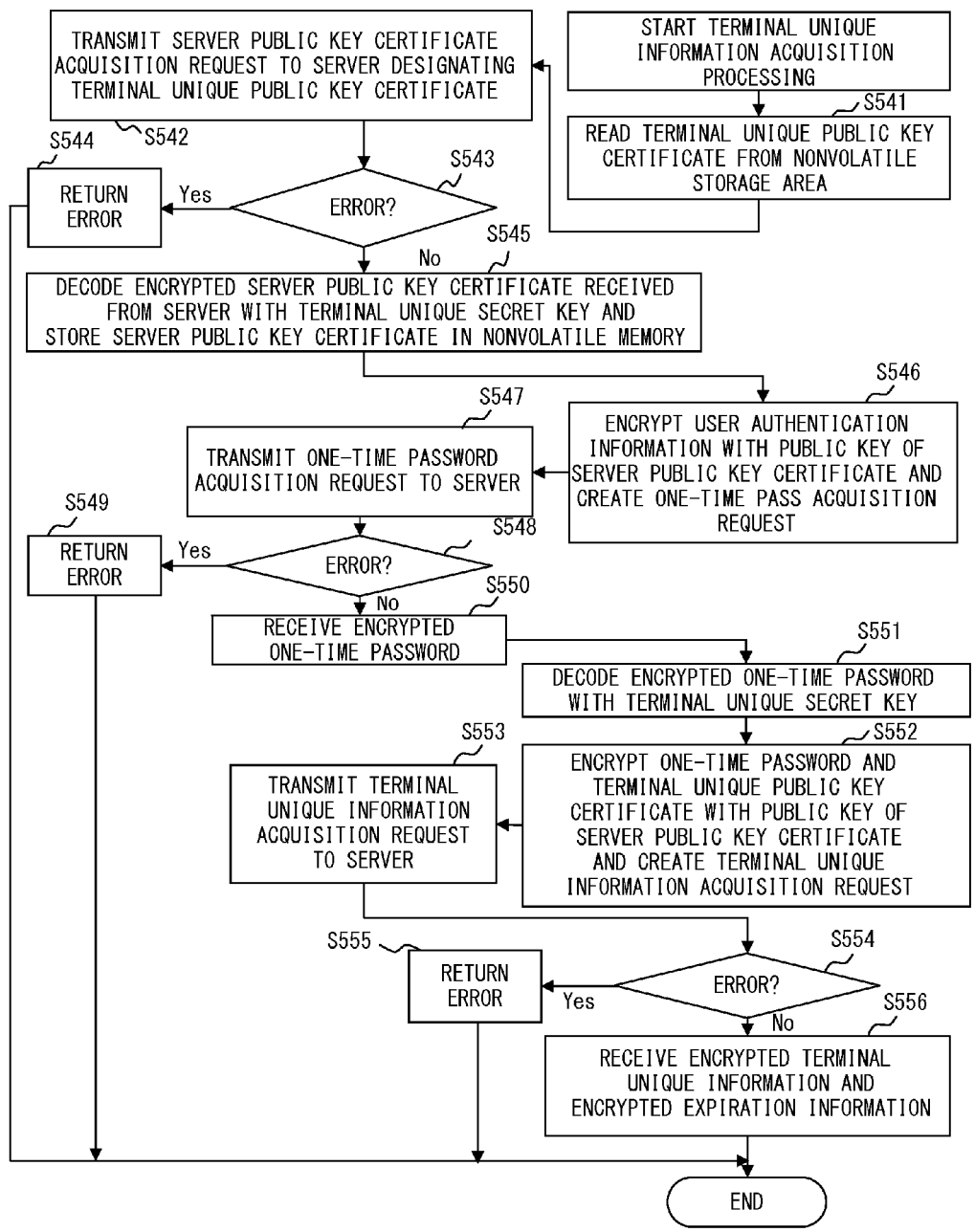
F I G. 5

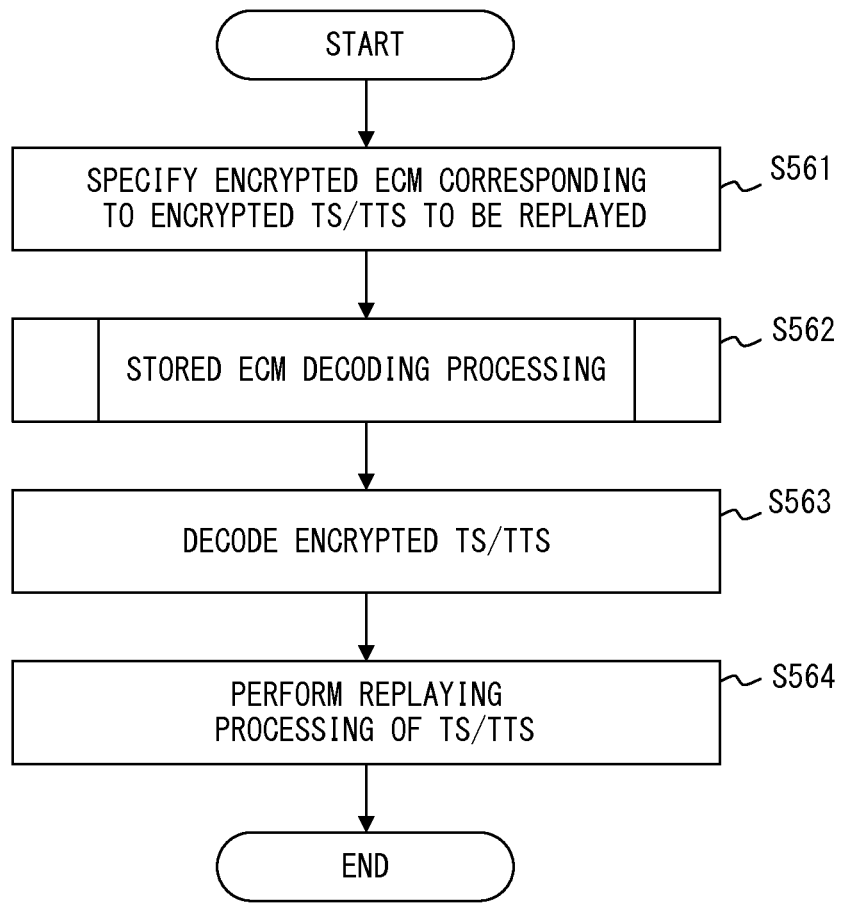
F I G. 6

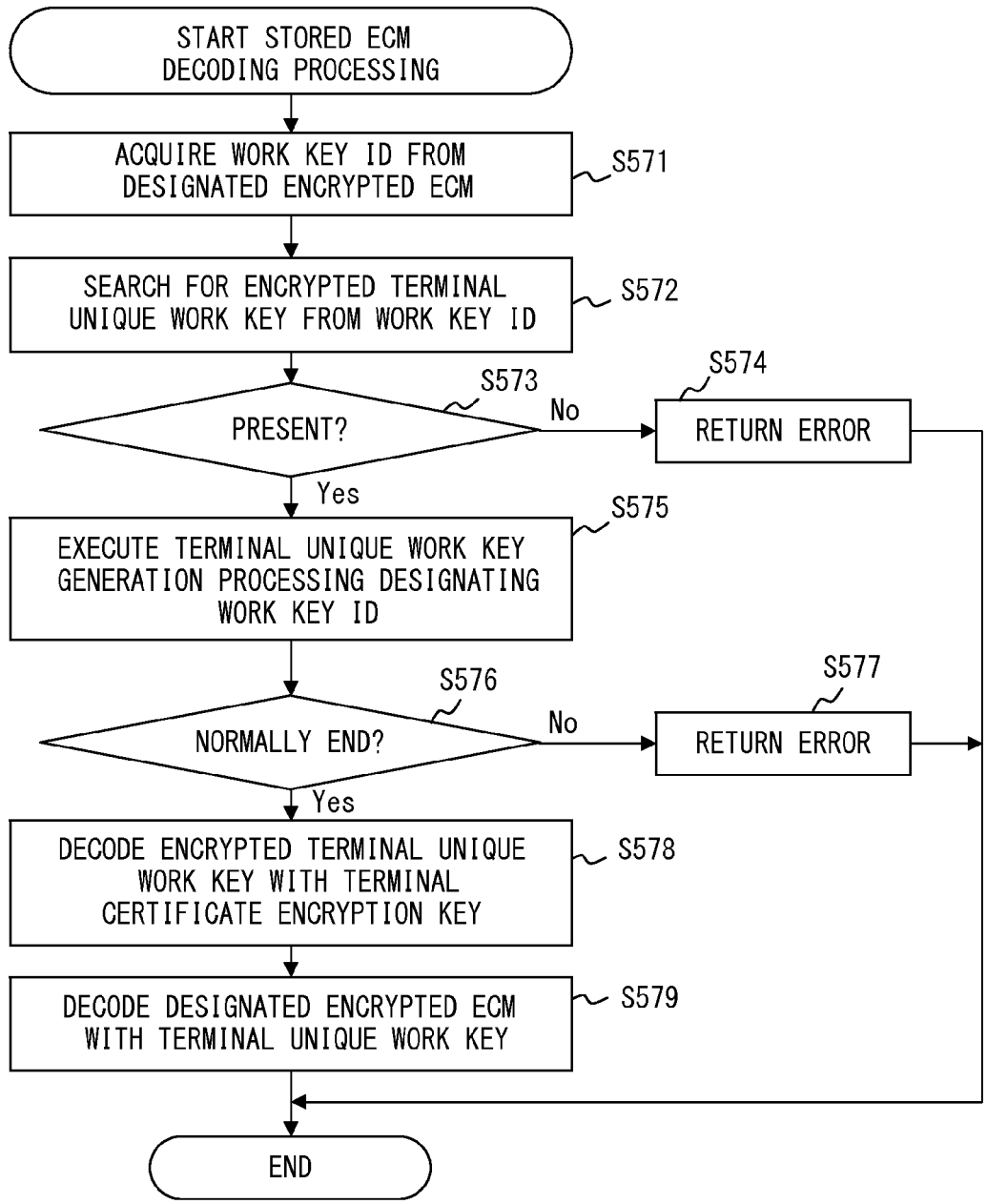
F I G. 7

| ENCRYPTED TERMINAL UNIQUE PUBLIC KEY CERTIFICATE | DECRYPTION DESTINATION TERMINAL CERTIFICATE LIST | TERMINAL UNIQUE INFORMATION | EXPIRATION INFORMATION | |
| --- | --- | --- | --- | --- |
| | | | START TIME | END TIME |
| xxxxxxxxxxxxxxxxx | xxxxxxxxxxxxxxxx | xxxxxxxxxxxxxxxx | YYYYMMDD:hhmmss | YYYYMMDD:hhmmss |

372

F I G. 9

| TERMINAL UNIQUE PUBLIC KEY CERTIFICATE OF TERMINAL A | TERMINAL UNIQUE PUBLIC KEY CERTIFICATE OF TERMINAL B | ELECTRONIC SIGNATURE (SIGNED WITH TERMINAL UNIQUE SECRET KEY OF TERMINAL B) |
| --- | --- | --- |

FIG. 10

| TERMINAL UNIQUE PUBLIC KEY CERTIFICATE OF TERMINAL A | TERMINAL UNIQUE PUBLIC KEY CERTIFICATE OF TERMINAL B | ELECTRONIC SIGNATURE (SIGNED WITH TERMINAL UNIQUE SECRET KEY OF TERMINAL B) 296 |
|---|---|---|

FIG. 14

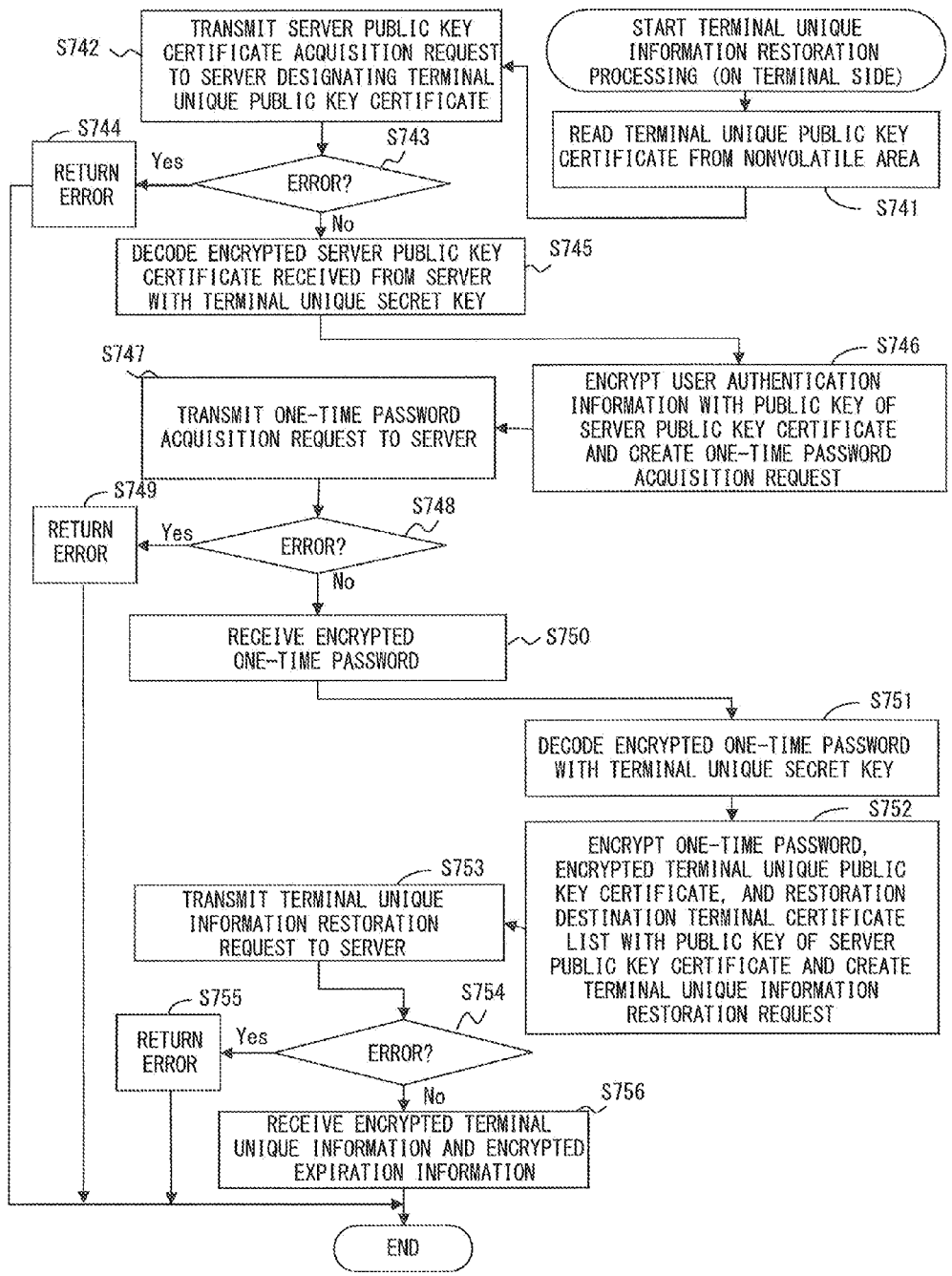
F I G. 1 7

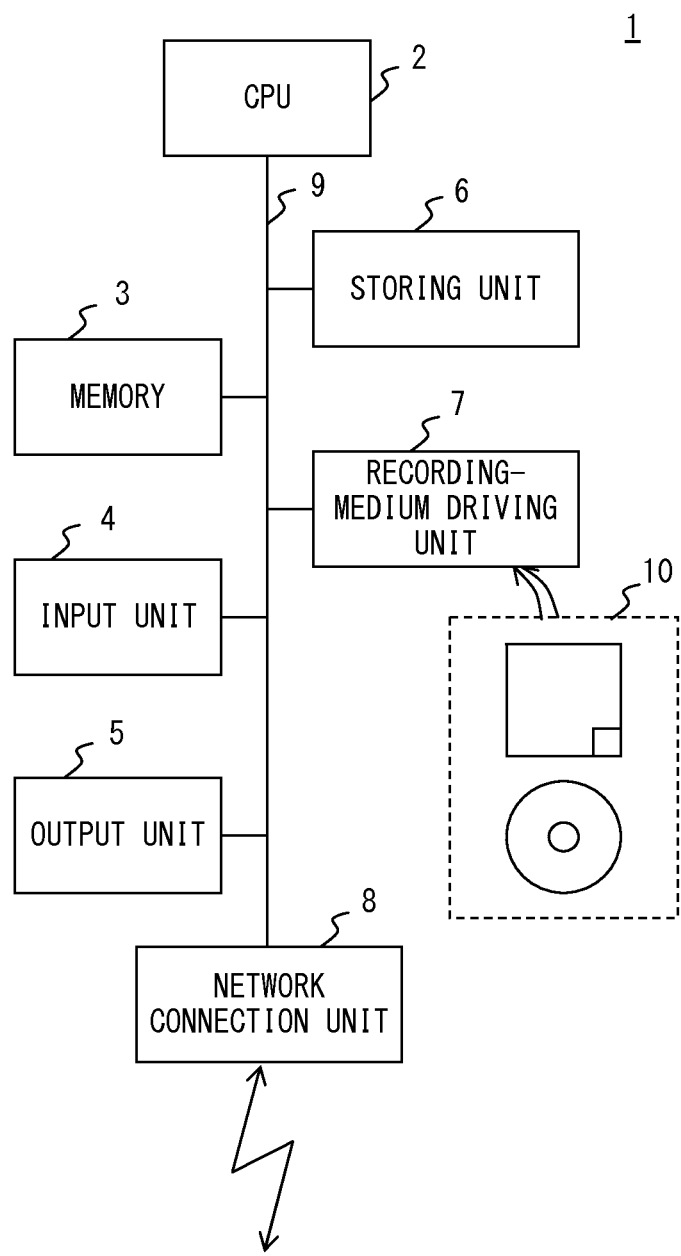
F I G. 2 1

TRANSMISSION METHOD AND SYSTEM FOR TERMINAL UNIQUE INFORMATION

CROSS-REFERENCE TO RELATED APPLICATION

This application is a continuation application of International Application PCT/JP2012/052560 filed on Feb. 3, 2012 and designated the U.S., the entire contents of which are incorporated herein by reference.

FIELD

The embodiments discussed herein are relates to a transmission method and a system for terminal unique information.

BACKGROUND

Currently, a terminal is used that has a function capable of storing (dubbing) download contents and broadcast contents in a built-in hard drive (HDD) or an external HDD.

Stored data of the contents can be replayed only in the terminal that receives the data. Otherwise, it is likely that an unlimited number of terminals can copy and use the data stored in the HDD without qualification.

However, when the data can be replayed only in the terminal that receives the data, if the terminal is broken, a user has to give up replaying the stored data.

To solve such a problem, when the terminal that receives the data is broken, to replay the stored data, conventionally, information for restoring stored data of each of terminals is managed by a server while being tied to a user and, even when the terminal is broken, a new terminal is enabled to replay the stored data by acquiring the information for replaying stored data from a center.

Patent Document 1: International Publication Pamphlet No. WO2003/005208

Patent Document 2: Japanese Patent Application Laid-Open No. 2001-60945

SUMMARY

According to an aspect of the embodiments, a terminal unique information transmission method including: receiving, by a server, from a terminal, a terminal unique information acquisition request including a terminal unique public key certificate of the terminal; generating an encrypted terminal unique public key certificate by encrypting the terminal unique public key certificate of the terminal; checking, by the server, whether the generated encrypted terminal unique public key certificate is described in a discarded terminal information table; and transmitting, by the server, when the generated encrypted terminal unique public key certificate is not described in the discarded terminal information table, a terminal unique information of the terminal to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a detailed configuration diagram of a terminal according to the embodiment.

FIG. 3 is a flowchart of receiving/replaying/storing processing for an IP broadcast according to the embodiment.

FIG. 4 is a flowchart of terminal unique work key generation processing according to the embodiment.

FIG. 5 is a flowchart of terminal unique information acquisition processing according to the embodiment.

FIG. 6 is a flowchart of stored data replaying processing according to the embodiment.

FIG. 7 is a flowchart of stored ECM decoding processing according to the embodiment.

FIG. 9 is an example of a terminal unique information management table.

FIG. 10 is an example of a restoration destination terminal certificate list of the terminal unique information management table.

FIG. 14 is an example of the restoration destination terminal certificate list.

FIG. 17 is a flowchart of terminal unique information restoration processing (on a terminal side) according to the embodiment.

FIG. 21 is a configuration diagram of an information processing apparatus (a computer).

DESCRIPTION OF EMBODIMENTS

An embodiment is explained with reference to the drawings.

Figure 1:
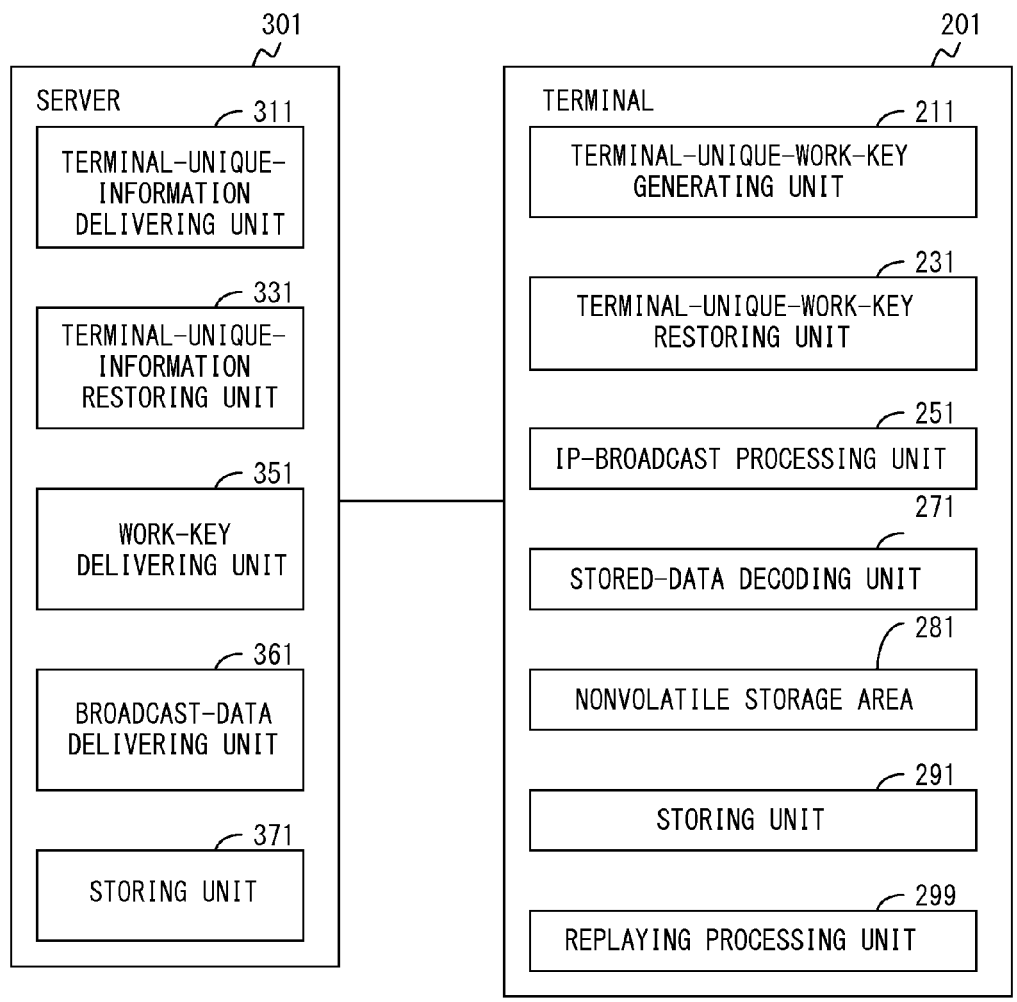
FIG. 1 is a configuration diagram of a system according to an embodiment.

FIG. 1 is a configuration diagram of a system according to the embodiment.

A system 101 includes a terminal 201 and a server 301.

The terminal 201 and the server 301 are connected via a wired or wireless network.

The terminal 201 is an apparatus that performs receiving, storing, replaying and the like of broadcast data. The terminal 201 is, for example, a personal computer, a cellular phone, a portable terminal, or a video recording apparatus.

The terminal 201 includes a terminal-unique-work-key generating unit 211, a terminal-unique-work-key restoring unit 231, an Internet protocol (IP)-broadcast processing unit 251, an stored-data decoding unit 271, a nonvolatile storage area 281, a storing unit 291, and a replaying processing unit 299.

The terminal-unique-work-key generating unit 211 generates a terminal unique work key.

The terminal-unique-work-key restoring unit 231 restores the terminal unique work key.

The IP-broadcast processing unit 251 receives an IP broadcast (broadcast data) and performs decoding of the broadcast data, re-encryption of the broadcast data, and storing the broadcast data in the storing unit.

The stored-data decoding unit 271 decodes encrypted data stored in the storing unit 291.

The nonvolatile storage area 281 is a nonvolatile storage device or storage medium that stores data. The nonvolatile storage area 281 is, for example, a magnetic disk device (a hard disk drive) or a semiconductor storage device.

The storing unit 291 is a storage device or a storage medium that stores data. The storing unit 291 is, for example, a magnetic disk device (a hard disk drive), a semiconductor storage device, or a memory card. The storing unit 291 is detachable from the terminal 201 and can be connected to other terminals.

The replaying processing unit 299 subjects decoded data to replaying processing.

The server 301 includes a terminal-unique-information delivering unit 311, a terminal-unique-information restoring unit 331, a work-key delivering unit 351, a broadcast-data delivering unit 361, and a storing unit 371.

The terminal-unique-information delivering unit 311 transmits encrypted terminal unique information to a terminal. The terminal unique information is terminal unique information different for each of terminals.

The terminal-unique-information restoring unit 331 receives a terminal unique information restoration request and performs, for example, determination concerning whether the terminal 201 is already discarded and transmission of encrypted terminal unique information.

The work-key delivering unit 351 transmits a work key to the terminal 201.

The broadcast-data delivering unit 361 transmits broadcast data to the terminal 201. The broadcast data includes encrypted TS/TTS and encrypted ECM.

The storing unit 371 is a storage device that stores data. The storing unit 371 is, for example, a magnetic disk device (a hard disk drive) or a semiconductor storage device.

FIG. 2 is a detailed configuration diagram of the terminal according to the embodiment.

In FIG. 2, components related to receiving and storing broadcast data and replaying stored data are depicted. The other components are not illustrated.

In the following explanation, components denoted by the same reference numerals and signs in the figures are the same components and have the same effects. Therefore, explanation of the components is sometimes omitted.

The IP-broadcast processing unit 251 includes a work-key acquiring unit 252, a broadcast-data receiving unit 253, an ECM decoding unit 254, a TS/TTS decoding unit 255, an ECM-for-storing generating unit 256, a TS/TTS re-encrypting unit 257, and an ECM re-encrypting unit 258.

The work-key acquiring unit 252 acquires a work key 282 from the work-key delivering unit 351 and stores the work key 282 in the nonvolatile storage area 281.

The broadcast-data receiving unit 253 receives broadcast data from the broadcast-data delivering unit 361.

The broadcast data includes an encrypted Transport Stream (TS)/Timestamped TS (TTS) 259 and an encrypted Entitlement Control Message (ECM) 260.

The encrypted TS/TTS 259 is data of a TS format or a TTS format (TS/TTS) encrypted by a scramble key.

The encrypted ECM 260 includes a work key ID and an encrypted scramble key. The work key ID is an identifier indicating a work key used for encryption of a scramble key. The encrypted scramble key is the scramble key encrypted by the work key.

The broadcast-data receiving unit 253 outputs the encrypted ECM 260 to the ECM decoding unit 254 and outputs the encrypted TS/TTS 259 to the TS/TTS decoding unit 255.

The ECM decoding unit 254 decodes the encrypted ECM 260 (specifically, decodes the encrypted scramble key) using the work key 282 indicated by the work key ID and outputs an ECM 261 to the TS/TTS decoding unit 255 and the ECM-for-storing generating unit 256. The ECM 261 includes the work key ID and the decoded scramble key.

The TS/TTS decoding unit 255 decodes the encrypted TS/TTS 259 using the scramble key included in the ECM 261 and outputs a TS/TTS 262 to the replaying processing unit 299 and the TS/TTS re-encrypting unit 257.

The ECM-for-storing generating unit 256 generates an ECM 263 including a scramble key (a scramble key for storing) generated anew and a work key ID indicating a terminal unique work key 221 (a terminal unique work key ID). The generated ECM 263 is referred to as ECM for storing 263. The terminal unique work key ID is an identifier indicating the terminal unique work key 221 or an encrypted terminal unique work key 293 obtained by encrypting the terminal unique work key 221.

The TS/TTS re-encrypting unit 257 encrypts the TS/TTS 262 using the scramble key for storing and stores an encrypted TS/TTS 295 in the storing unit 291. The encrypted TS/TTS 295 stored in the storing unit 291 is referred to as TS/TTS for storing 295 as well.

The ECM re-encrypting unit 258 encrypts the ECM for storing 263 using the terminal unique work key 221 indicated by the terminal unique work key ID and stores an encrypted ECM 294 in the storing unit 291. Specifically, the ECM re-encrypting unit 258 encrypts the scramble key for storing included in the ECM for storing 263 using the terminal unique work key 221. The encrypted ECM 294 includes the terminal unique work key and an encrypted scramble key (an encrypted scramble key for storing). Note that the encrypted ECM 294 stored in the storing unit 291 is sometimes referred to as stored ECM 294.

The terminal-unique-work-key generating unit 211 includes a terminal-unique-information-acquisition processing unit 212, a terminal-unique-work-key-generation processing unit 213, a terminal-certificate-encryption-key generating unit 214, a terminal-unique-work-key encrypting unit 215, a terminal-certificate encrypting unit 216, and an encrypted-terminal-unique-work-key managing unit 217.

The terminal-unique-information-acquisition processing unit 212 acquires encrypted terminal unique information 219 and encrypted expiration information 220.

The terminal-unique-work-key-generation processing unit 213 generates the terminal unique work key 221.

The terminal-certificate-encryption-key generating unit 214 generates a terminal certificate encryption key 285.

The terminal-unique-work-key encrypting unit 215 encrypts the terminal unique work key 221 and stores the encrypted terminal unique work key 293 in the storing unit 291.

The terminal-certificate encrypting unit 216 encrypts a terminal unique public key certificate 284 and stores an encrypted terminal unique public key certificate 292 in the storing unit 291.

The encrypted-terminal-unique-work-key managing unit 217 manages the encrypted terminal unique work key 293.

The nonvolatile storage area 281 stores the work key 282, a terminal unique secret key 283, the terminal unique public key certificate 284, and the terminal certificate encryption key 285. The terminal unique secret key 283 is a terminal unique secret key different for each of the terminals. The terminal unique public key certificate 284 is a certificate of a terminal unique public key different for each of the terminals. The terminal-unique-public-key certificate 284 includes a public key of the terminal 201.

The storing unit 291 stores the encrypted terminal unique public key certificate 292, the encrypted terminal unique work key 293, the encrypted ECM 294, and the encrypted TS/TTS 295.

The stored-data decoding unit 271 includes an stored-ECM decoding unit 272 and a TS/TTS decoding unit 273.

The stored-ECM decoding unit 272 decodes the encrypted ECM 294 stored in the storing unit 291 and outputs an ECM 274 to the TS/TTS decoding unit 273.

The TS/TTS decoding unit 273 decodes the encrypted TS/TTS 295 stored in the storing unit 291 with a scramble key of the ECM 274 and outputs a TS/TTS 275 to the replaying processing unit 299.

The replaying processing unit 299 performs decoding, digital/analog conversion processing, and the like of the TS/TTSs 262 and 275 and replays data.

FIG. 3 is a flowchart of receiving/replaying/storing processing for an IP broadcast according to the embodiment.

It is assumed that the terminal 201 is receiving broadcast data of a target channel for receiving from the server 301.

In step S501, the ECM decoding unit 254 acquires a work key ID of the target channel for receiving. Note that the work key ID is included in the received encrypted ECM 260.

In step S502, the ECM decoding unit 254 searches for the work key 282 corresponding to the acquired work key ID in the nonvolatile storage area 281.

In step S503, when the work key 282 is present, the control proceeds to step S505. When the work key 282 is absent, the control proceeds to step S504.

In step S504, the work-key acquiring unit 252 acquires a work key from the work-key delivering unit 351 and stores the work key in the nonvolatile storage area 281.

In step S505, the encrypted-terminal-unique-work-key managing unit 217 searches for the encrypted terminal unique work key 293 corresponding to the terminal unique work key ID in the storing unit 291.

In step S506, when the encrypted terminal unique work key is present, the control proceeds to step S510. When the encrypted terminal unique work key is absent, the control proceeds to step S507.

In step S507, the terminal-unique-work-key generating unit 211 generates the terminal unique work key designating a work key ID indicating a terminal unique work key to be generated. The terminal unique work key is generated by processing in steps S525 to S532 of terminal unique work key generation processing explained below.

In step S508, when the generation of the terminal unique work key normally ends, the control proceeds to step S510. When the generation of the terminal unique work key does not normally end, the control proceeds to step S509.

In step S509, the IP-broadcast processing unit 251 notifies the user of an error and ends the processing.

In step S510, the encrypted-terminal-unique-work-key managing unit 217 decodes the encrypted terminal unique work key 293 using the terminal certificate encryption key 285 and outputs a terminal unique work key to the ECM re-encrypting unit 258.

In step S511, the IP-broadcast processing unit 251 performs decoding processing and storing processing for broadcast data. Specifically, the ECM decoding unit 254 decodes the encrypted ECM 260 (specifically, decodes an encrypted scramble key included in the encrypted ECM 260) using the work key 282 corresponding to the work key ID of the target channel for receiving and outputs the ECM 261 to the TS/TTS decoding unit 255 and the ECM-for-storing generating unit 256.

The ECM-for-storing generating unit 256 generates the ECM for storing 263 including a scramble key (a scramble key for storing) generated anew and a terminal unique work key ID indicating the terminal unique work key 221.

The ECM re-encrypting unit 258 encrypts the ECM for storing 263 using the terminal unique work key 221 (encrypts the scramble key for storing included in the ECM for storing 263) and stores the encrypted ECM 294 in the storing unit 291.

The TS/TTS decoding unit 255 decodes the encrypted TS/TTS 259 using the scramble key included in the ECM 261 and outputs the TS/TTS 262 to the replaying processing unit 299 and the TS/TTS re-encrypting unit 257.

The replaying processing unit 299 performs decoding and digital/analog conversion processing of the TS/TTS 262 and replays data.

The TS/TTS re-encrypting unit 257 encrypts the TS/TTS 262 using the scramble key for storing included in the ECM for storing 263 and stores the encrypted TS/TTS 295 in the storing unit 291.

FIG. 4 is a flowchart of the terminal unique work key generation processing according to the embodiment.

In step S521, the terminal-unique-work-key generating unit 211 reads out the terminal certificate encryption key 285 from the nonvolatile storage area 281.

In step S522, the terminal-unique-work-key generating unit 211 decodes the encrypted terminal unique work key 293 corresponding to a designated work key ID using the terminal certificate encryption key 285.

In step S523, the terminal-unique-work-key generating unit 211 refers to expiration information of the terminal unique work key 221, compares the expiration information of the terminal unique work key 221 with terminal time, and determines whether the terminal unique work key 221 expires. The terminal time is time set in the terminal 201 and is present time. The expiration information includes end time indicating an expiration date of the terminal unique work key 221. It is determined whether the terminal unique work key 221 expires according to whether the end time passes the terminal time.

In step S524, when the terminal unique work key 221 expires, the processing ends. When the terminal unique work key 221 does not expire, the control proceeds to step S525.

In step S525, the terminal-unique-information-acquisition processing unit 212 executes terminal unique information acquisition processing designating the terminal unique public key certificate 284. Note that details of the terminal unique information acquisition processing are explained below.

In step S526, when an error is returned in the terminal unique information acquisition processing, the control proceeds to step S527. When an error is not returned, the control proceeds to step S528.

In step S527, the terminal-unique-work-key generating unit 211 returns an error.

In step S528, the terminal-unique-work-key-generation processing unit 213 decodes, using the terminal unique secret key 283, the encrypted terminal unique information 219 and the encrypted expiration information 220 received from the server 301 by the terminal unique information acquisition processing.

In step S529, the terminal-unique-work-key-generation processing unit 213 generates the terminal unique work key 221 from the terminal unique information, the expiration information, and the designated work key ID. Specifically, the terminal-unique-work-key-generation processing unit 213 generates key information using the terminal unique information and the designated work key ID. The key information is a unique value generated from the terminal unique information and the designated work key ID. The key information is, for example, data obtained by encrypting the terminal unique information and the designated work key ID. The terminal-unique-work-key-generation processing unit 213 adds the expiration information to the key information and sets the key information added with the expiration information as the terminal unique work key 221.

In step S530, the terminal-certificate-encryption-key generating unit 214 generates a common key from a public key in a server public key certificate received from the server 301 and the terminal unique secret key 283 according to a Diffie-Hellman (DH) system. The terminal-certificate-encryption-key generating unit 214 stores the common key in the nonvolatile storage area 281 as the terminal certificate encryption key 285.

In step S531, the terminal-unique-work-key encrypting unit 215 encrypts the terminal unique work key 221 using the terminal certificate encryption key 285 and stores the encrypted terminal unique work key 293 in the storing unit 291.

FIG. 5 is a detailed flowchart of the terminal unique information acquisition processing according to the embodiment.

The flowchart of FIG. 5 corresponds to step S525 in FIG. 4.

In step S541, the terminal-unique-information-acquisition processing unit 212 reads out the terminal unique public key certificate 284 from the nonvolatile storage area 281.

In step S542, the terminal-unique-information-acquisition processing unit 212 transmits a server public key certificate acquisition request to the server 301 designating the terminal unique public key certificate 284.

In step S543, when the terminal-unique-information-acquisition processing unit 212 receives an error response from the server 301, the control proceeds to step S544. When the terminal-unique-information-acquisition processing unit 212 does not receive the error response, the control proceeds to step S545.

In step S544, the terminal-unique-information-acquisition processing unit 212 returns an error.

In step S545, the terminal-unique-information-acquisition processing unit 212 decodes an encrypted server public key certificate received from the server 301 using the terminal unique secret key 283 and stores the server public key certificate in the nonvolatile storage area 281. The server public key certificate is a certificate of a public key of the server and includes the public key of the server (a server public key).

In step S546, the terminal-unique-information-acquisition processing unit 212 encrypts user authentication information 226 using the public key of the server public key certificate and creates a one-time password acquisition request. The one-time password acquisition request includes encrypted user authentication information. Note that the user authentication information 226 to be used is designated as an input parameter at the start of the processing.

In step S547, the terminal-unique-information-acquisition processing unit 212 transmits the one-time password acquisition request to the server 301.

In step S548, when the terminal-unique-information-acquisition processing unit 212 receives an error response from the server 301, the control proceeds to step S549. When the terminal-unique-information-acquisition processing unit 212 does not receive the error response, the control proceeds to step S550.

In step S549, the terminal-unique-information-acquisition processing unit 212 returns an error.

In step S550, the terminal-unique-information-acquisition processing unit 212 receives an encrypted one-time password from the server 301.

In step S551, the terminal-unique-information-acquisition processing unit 212 decodes the encrypted one-time password using the terminal unique secret key 283.

In step S552, the terminal-unique-information-acquisition processing unit 212 encrypts the one-time password and the terminal unique public key certificate 284 using the public key of the server public key certificate and creates a terminal unique information acquisition request. That is, the terminal unique information acquisition request includes an encrypted one-time password and an encrypted terminal unique public key certificate.

In step S553, the terminal-unique-information-acquisition processing unit 212 transmits the terminal unique information acquisition request to the server 301.

In step S554, when the terminal-unique-information-acquisition processing unit 212 receives an error response from the server 301, the control proceeds to step S555. When the terminal-unique-information-acquisition processing unit 212 does not receive the error response, the control proceeds to step S556.

In step S555, the terminal-unique-information-acquisition processing unit 212 returns an error.

In step S556, the terminal-unique-information-acquisition processing unit 212 receives the encrypted terminal unique information 219 and the encrypted expiration information 220 from the server 301.

Replaying processing for the encrypted TS/TTS (stored data) 295 stored in the storing unit 291 is explained.

FIG. 6 is a flowchart of stored data replaying processing according to the embodiment.

In step S561, the stored-ECM decoding unit 272 specifies the encrypted ECM 294 corresponding to the encrypted TS/TTS 295 to be replayed. That is, the stored-ECM decoding unit 272 specifies the encrypted ECM 294 including the scramble key used for the encryption of the encrypted TS/TTS 295.

In step S562, the stored-ECM decoding unit 272 performs the stored ECM decoding processing designating the specified encrypted ECM 294 and outputs the decoded ECM 274 to the TS/TTS decoding unit 273. Note that details of the stored ECM decoding processing are explained below.

In step S563, the TS/TTS decoding unit 273 decodes the encrypted TS/TTS 295 with the scramble key of the ECM 274 and outputs the TS/TTS 275 to the replaying processing unit 299.

In step S564, the replaying processing unit 299 performs decoding, digital/analog conversion processing, and the like of the TS/TTS 275 and replays data.

FIG. 7 is a flowchart of the stored ECM decoding processing according to the embodiment.

The flowchart of FIG. 7 corresponds to step S562 in FIG. 6.

In step S571, the stored-ECM decoding unit 272 acquires a work key ID included in the designated encrypted ECM 294.

In step S572, the stored-ECM decoding unit 272 searches for the encrypted terminal unique work key 293 corresponding to the acquired work key ID in the storing unit 291.

In step S573, when the encrypted terminal unique work key 293 is present, the control proceeds to step S575. When the encrypted terminal unique work key 293 is absent, the control proceeds to step S574.

In step S574, the stored-ECM decoding unit 272 returns an error.

In step S575, the stored-ECM decoding unit 272 executes the terminal unique work key generation processing designating the acquired work key ID and acquires the terminal certificate encryption key 285. The terminal unique work key generation processing is as explained with reference to FIG. 4.

In step S576, when the terminal unique work key generation processing normally ends (an error is not returned), the control proceeds to step S578. When the terminal unique work key generation processing does not normally end (an error is returned), the control proceeds to step S577.

In step S577, the stored-ECM decoding unit 272 returns an error.

In step S578, the stored-ECM decoding unit 272 decodes the encrypted terminal unique work key 293 using the terminal certificate encryption key 285 and acquires the terminal unique work key 211.

In step S579, the stored-ECM decoding unit 272 decodes the designated encrypted ECM 294 using the terminal unique work key 221. Specifically, the stored-ECM decoding unit 272 decodes the encrypted scramble key included in the designated encrypted ECM 294 using key information of the terminal unique work key 221. The stored-ECM decoding unit 272 outputs the ECM 274 including the decoded scramble key to the TS/TTS decoding unit 273.

Processing (terminal unique information delivery processing) on the server side during the terminal unique information acquisition processing is explained.

Figure 8:
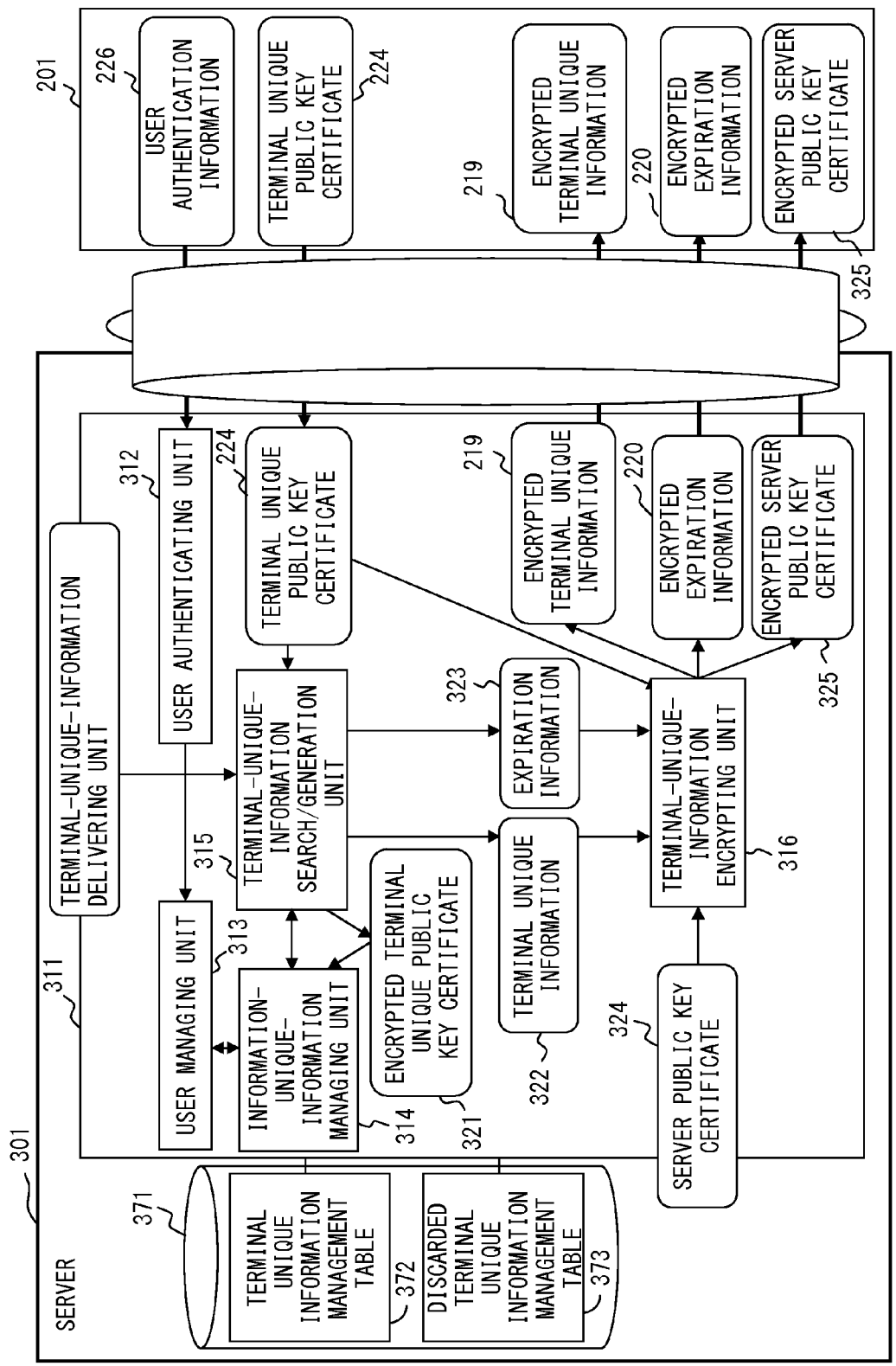
FIG. 8 is a detailed configuration diagram of a server according to the embodiment.

FIG. 8 is a detailed configuration diagram of the server according to the embodiment.

In FIG. 8, components related to delivery of terminal unique information are depicted. The other components are not illustrated.

The terminal-unique-information delivering unit 311 includes a user authenticating unit 312, a user managing unit 313, a terminal-unique-information managing unit 314, a terminal-unique-information search/generation unit 315, and a terminal-unique-information encrypting unit 316.

The user authenticating unit 312 decodes encrypted user authentication information.

The user managing unit 313 performs user authentication.

The terminal-unique-information managing unit 314 performs, for example, writing data in and deleting data from a terminal unique information management table 372 and a discarded terminal unique information management table 373.

The terminal-unique-information search/generation unit 315 performs, for example, searching through the terminal unique information management table and generating a record.

The terminal-unique-information encrypting unit 316 encrypts terminal unique information 322, expiration information 323, and a server public key certificate 324 and generates the encrypted terminal unique information 219, the encrypted expiration information 220, and the encrypted server public key certificate 325.

The storing unit 371 includes the terminal unique information management table 372 and the discarded terminal unique information management table 373.

FIG. 9 is an example of the terminal unique information management table.

In the terminal unique information management table 372, an encrypted terminal unique public key certificate, a restoration destination terminal certificate list, terminal unique information, and expiration information are described in association with one another.

The encrypted terminal unique public key certificate is a certificate of an encrypted terminal unique public key.

The restoration destination terminal certificate list is information indicating a terminal that performed terminal unique work key restoration processing in the past. Note that details of the restoration destination terminal certificate list are explained below.

The terminal unique information is terminal unique information generated from the terminal unique public key certificate.

The expiration information indicates start time and end time of an expiration date of a terminal unique work key.

FIG. 10 is an example of the restoration destination terminal certificate list of the terminal unique information management table.

The restoration destination terminal certificate list includes terminal unique public key certificates of terminals for which the terminal unique work key restoration processing was performed in the past and an electronic signature.

The terminal unique public key certificates of the terminals for which the terminal unique work key restoration processing was performed in the past are arranged from the head in order of the terminals that performed the terminal unique work key restoration processing.

At the tail of the restoration destination terminal certificate list, as the electronic signature, a value signed with a secret key of a terminal of the last terminal unique public key certificate on a terminal unique public key certificate of a terminal that performed the terminal unique work key restoration processing in the past is described.

The restoration destination terminal certificate list depicted in FIG. 10 includes terminal unique public key certificates of a terminal A and a terminal B and an electronic signature signed on the terminal unique public key certificates of the terminals A and B with a terminal unique secret key of the terminal B.

Figure 11:
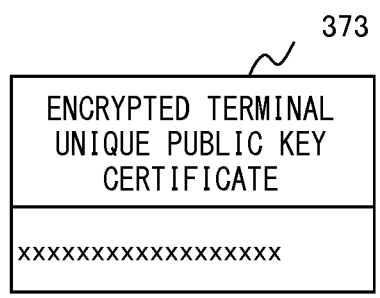
FIG. 11 is an example of a discarded terminal unique information management table.

FIG. 11 is an example of the discarded terminal unique information management table.

In the discarded terminal unique information management table 373, an encrypted terminal unique public key certificate corresponding to a discarded terminal is described. That is, in the discarded terminal unique information management table 373, an encrypted terminal unique public key certificate corresponding to a terminal not permitted to acquire the terminal unique information is described.

Figure 12:
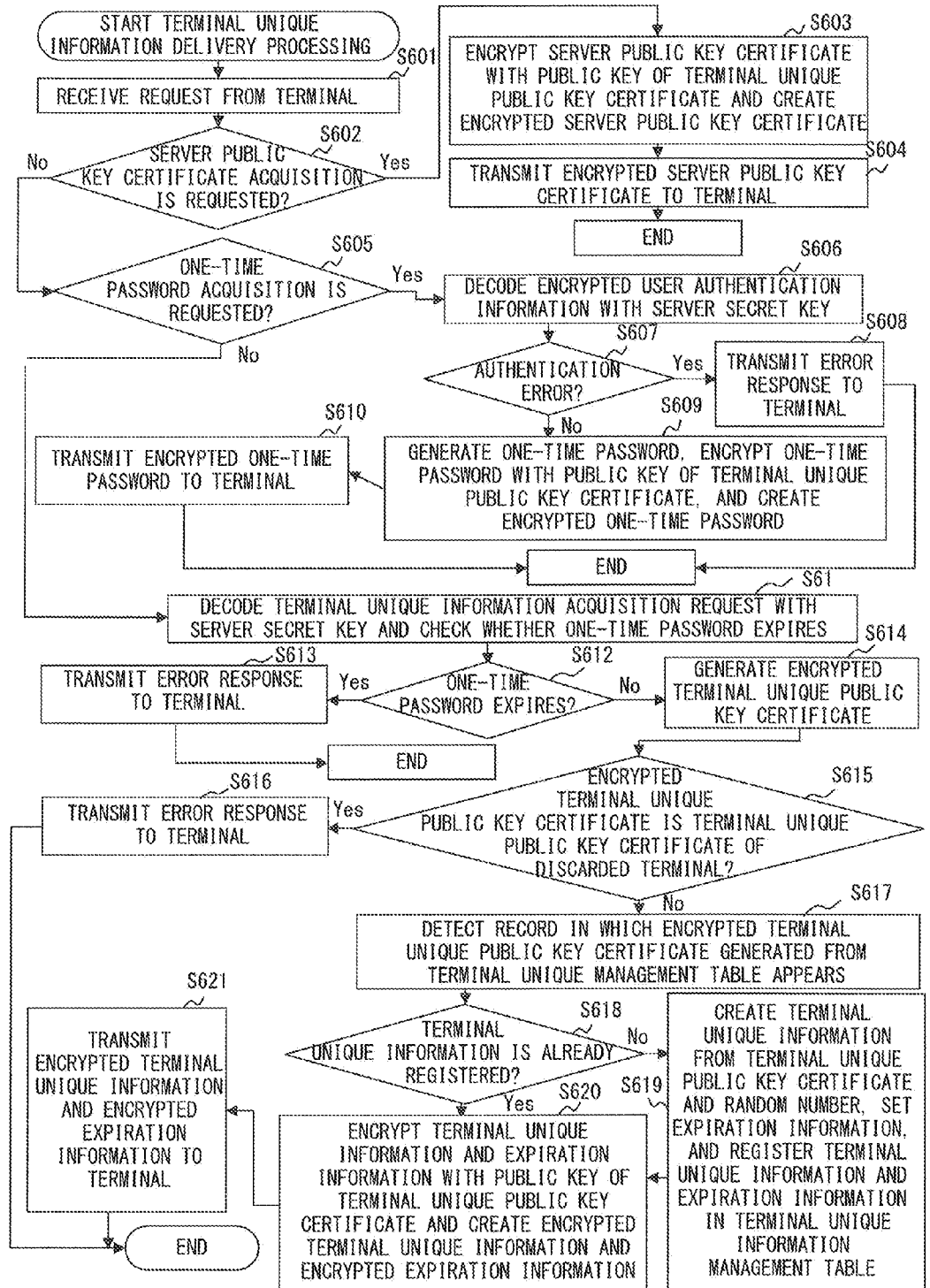
FIG. 12 is a flowchart of terminal unique information delivery processing according to the embodiment.

FIG. 12 is a flowchart of the terminal unique information delivery processing according to the embodiment.

In step S601, the terminal-unique-information delivering unit 311 receives a request from the terminal 201.

In step S602, the terminal-unique-information delivering unit 311 determines whether the request is a server public key certificate acquisition request. When the request is the server public key certificate acquisition request, the control proceeds to step S603. When the request is not the server public key certificate acquisition request, the control proceeds to step S605.

In step S603, the terminal-unique-information encrypting unit 316 encrypts the server public key certificate 324 with a public key of a terminal unique public key certificate designated by the server public key certificate acquisition request and creates the encrypted server public key certificate 325.

In step S604, the terminal-unique-information encrypting unit 316 transmits an encrypted server public key certificate to the terminal 201.

In step S605, the terminal-unique-information delivering unit 311 determines whether the request is a one-time password acquisition request. When the request is the one-time password acquisition request, the control proceeds to step S606. When the request is not the one-time password acquisition request, the control proceeds to step S611. Note that, when the request is not the one-time password acquisition request, the request received from the terminal is a terminal unique information acquisition request.

In step S606, the user authenticating unit 312 decodes encrypted user authentication information included in the one-time password acquisition request using a server secret key and acquires the user authentication information 226.

In step S607, the user managing unit 313 checks the user authentication information and performs user authentication. When the user authentication is an error, the control proceeds to step S608. When the user authentication is not an error, the control proceeds to step S609.

In step S608, the terminal-unique-information delivering unit 311 transmits an error response to the terminal 201.

In step S609, the terminal-unique-information delivering unit 311 generates a one-time password, encrypts the one-time password with the public key of the terminal unique public key certificate, and creates an encrypted one-time password.

In step S610, the terminal-unique-information delivering unit 311 transmits the encrypted one time password to the terminal 201.

In step S611, the user authenticating unit 312 decodes the terminal unique information acquisition request with the server secret key and acquires the one-time password and the terminal unique public key certificate 284. The user authenticating unit 312 checks whether the one-time password expires.

In step S612, when the one-time password expires, the control proceeds to step S613. When the password does not expire, the control proceeds to step S614.

In step S613, the terminal-unique-information delivering unit 311 transmits an error response to the terminal 201.

In step S614, the terminal-unique-information search/generation unit 315 generates an encrypted terminal unique public key certificate 321. Specifically, the terminal-unique-information search/generation unit 315 generates a common key from the public key of the terminal unique public key certificate 284 and the server secret key according to the Diffie-Hellman (DH) system. The terminal-unique-information search/generation unit 315 sets the generated common key as a terminal certificate encryption key. The terminal-unique-information search/generation unit 315 encrypts the terminal unique public key certificate 284 using the terminal certificate encryption key and generates the encrypted terminal unique public key certificate 321.

In step S615, the terminal-unique-information search/generation unit 315 refers to the discarded terminal unique information management table 373 and checks whether the encrypted terminal unique public key certificate 321 is a terminal unique public key certificate of a discarded terminal, that is, whether the encrypted terminal unique public key certificate 321 is described in the discarded terminal unique information management table 373. When the encrypted terminal unique public key certificate 321 is described in the discarded terminal unique information management table 373, the control proceeds to step S616. When the encrypted terminal unique public key certificate 321 is not described in the discarded terminal unique information management table 373, the control proceeds to step S617.

In step S616, the terminal-unique-information delivering unit 311 transmits an error response to the terminal 201.

In step S617, the terminal-unique-information search/generation unit 315 detects, from the terminal unique information management table 372, a record in which the generated encrypted terminal unique public key certificate 321 appears.

In step S618, the terminal-unique-information search/generation unit 315 determines whether terminal unique information is registered (described) in the detected record. When the terminal unique information is registered in the detected record, the control proceeds to step S620. When the terminal unique information is not registered in the detected record, the control proceeds to step S619. When the terminal unique information is registered in the detected record, the terminal-unique-information search/generation unit 315 outputs the terminal unique information and expiration information of the detected record to the terminal-unique-information encrypting unit 316.

In step S619, the terminal-unique-information search/generation unit 315 creates terminal unique information from the terminal unique public key certificate and a random number, sets expiration information, and outputs the terminal unique information and the expiration information to the terminal-unique-information managing unit 314 and the terminal-unique-information encrypting unit 316. The terminal-unique-information managing unit 314 writes the terminal unique information and the expiration information in the terminal unique information management table 372. Note that the terminal unique information is a unique value generated from the terminal unique public key certificate and a random number.

In step S620, the terminal-unique-information encrypting unit 316 encrypts the terminal unique information and the expiration information using the public key of the terminal unique public key certificate and creates encrypted terminal unique information and encrypted expiration information.

In step S621, the terminal-unique-information encrypting unit 316 transmits the encrypted terminal unique information and the encrypted expiration information to the terminal 201.

Restoration of a terminal unique work key is explained.

When a terminal is broken, the user removes a storing unit from the broken terminal and connects the storing unit to another terminal. Alternatively, the user copies data of the storing unit of the broken terminal to a storing unit of another terminal.

As explained concerning the stored data replaying processing, a terminal unique work key is used for replaying stored data. To obtain the terminal unique work key, an encrypted terminal unique work key is decoded using a terminal certificate encryption key.

When the storing unit is moved from the broken terminal to a new terminal, since the terminal certificate encryption key is different for each of the terminals, the encrypted terminal unique work key stored in the storing unit is not detected by the new terminal.

Therefore, stored data stored in the storing unit is not replayed simply by moving the storing unit from the broken terminal to the new terminal.

To replay, in the new terminal, the stored data stored in the broken terminal, a terminal unique work key corresponding to the new terminal is used.

Therefore, when the storing unit is connected to the new terminal, the user causes the terminal to execute terminal unique work key restoration processing explained below.

Consequently, the encrypted terminal unique work key stored in the storing unit is updated to the encrypted terminal unique work key decodable by the new terminal.

Figure 13:
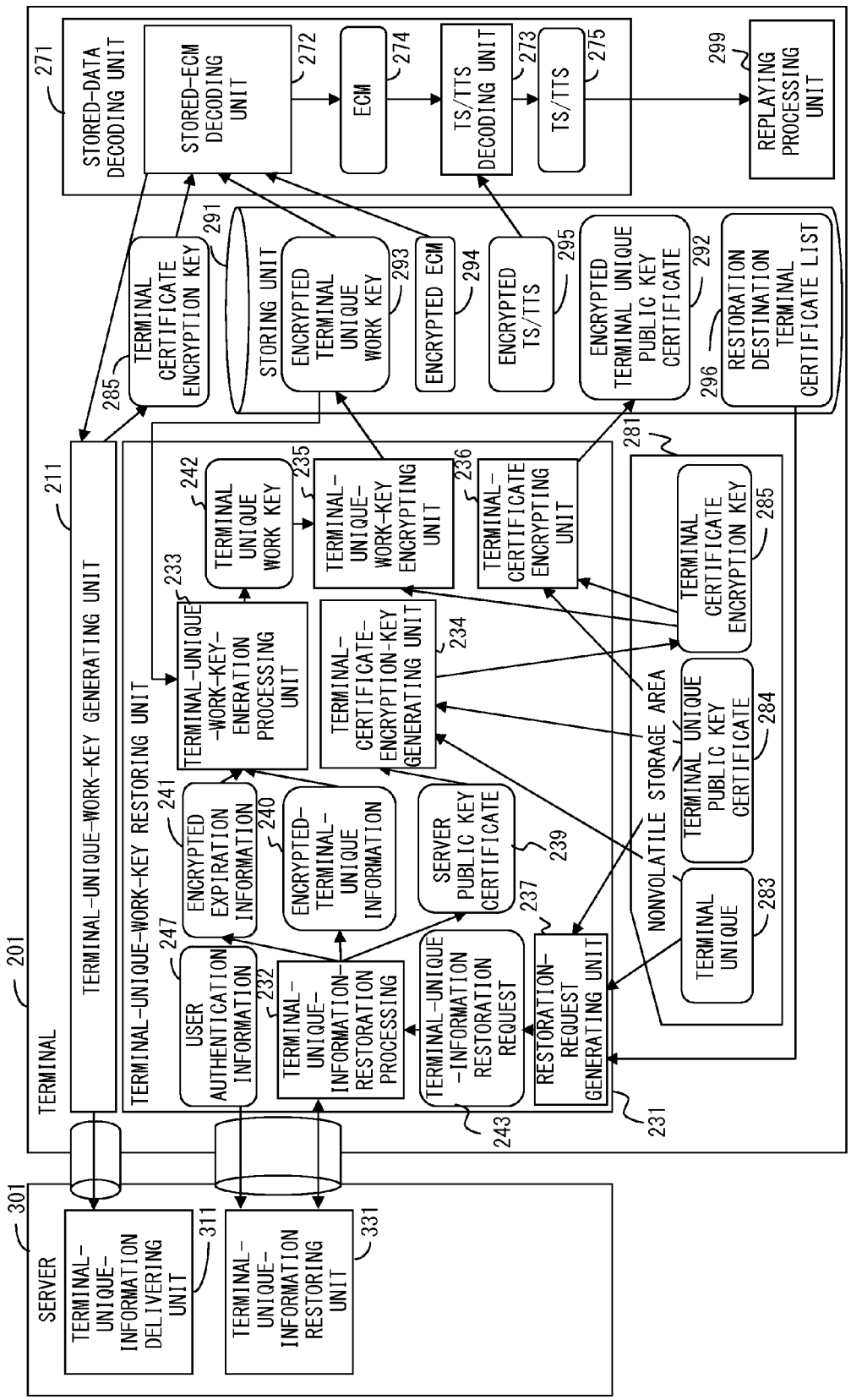
FIG. 13 is a detailed configuration diagram of a terminal according to the embodiment.

FIG. 13 is a detailed configuration diagram of the terminal according to the embodiment.

In FIG. 13, components related to restoration of a terminal unique work key are depicted. The other components or the components explained above are not illustrated.

The terminal-unique-work-key restoring unit 231 includes a terminal-unique-information-restoration processing unit 232, a terminal-unique-work-key-generation processing unit 233, a terminal-certificate-encryption-key generating unit 234, a terminal-unique-work-key encrypting unit 235, a terminal-certificate encrypting unit 236, and a restoration-request generating unit 237.

The terminal-unique-information-restoration processing unit 232 executes terminal unique information restoration processing (on the terminal side).

The terminal-unique-work-key-generation processing unit 233 generates a terminal unique work key 242.

The terminal-certificate-encryption-key generating unit 234 generates the terminal certificate encryption key 285.

The terminal-unique-work-key encrypting unit 235 encrypts the terminal unique work key 242 using the terminal certificate encryption key 285 and stores the encrypted terminal unique work key 293 in the storing unit 291.

The terminal-certificate encrypting unit 236 encrypts the terminal unique public key certificate 284 using the terminal certificate encryption key 285 and stores the encrypted terminal unique public key certificate 292 in the storing unit 291.

The restoration-request generating unit 237 generates a terminal unique information restoration request 243.

The nonvolatile storage area 281 stores the terminal unique secret key 283, the terminal unique public key certificate 284, and the terminal certificate encryption key 285.

The storing unit 291 stores the encrypted terminal unique public key certificate 292, the encrypted terminal unique work key 293, the encrypted ECM 294, the encrypted TS/TTS 295, and a restoration destination terminal certificate list 296.

FIG. 14 is an example of the restoration destination terminal certificate list.

The restoration destination terminal certificate list 296 includes terminal unique public key certificates of terminals that performed the terminal unique work key restoration processing in the past and an electronic signature.

The terminal unique public key certificates of the terminals that performed the terminal unique work key restoration processing in the past are arranged from the head in order of the terminals that performed the terminal unique work key restoration processing.

At the tail of the restoration destination terminal certificate list, as the electronic signature, a value signed with a secret key (a terminal unique secret key) of a terminal of the last terminal unique public key certificate on a terminal unique public key certificate of a terminal that performed the terminal unique work key restoration processing in the past is described.

The restoration destination terminal certificate depicted in FIG. 14 includes terminal unique public key certificates of the terminal A and the terminal B and an electronic signature signed on the terminal unique public key certificates of the terminals A and B with a terminal unique secret key of the terminal B.

Figure 15A:
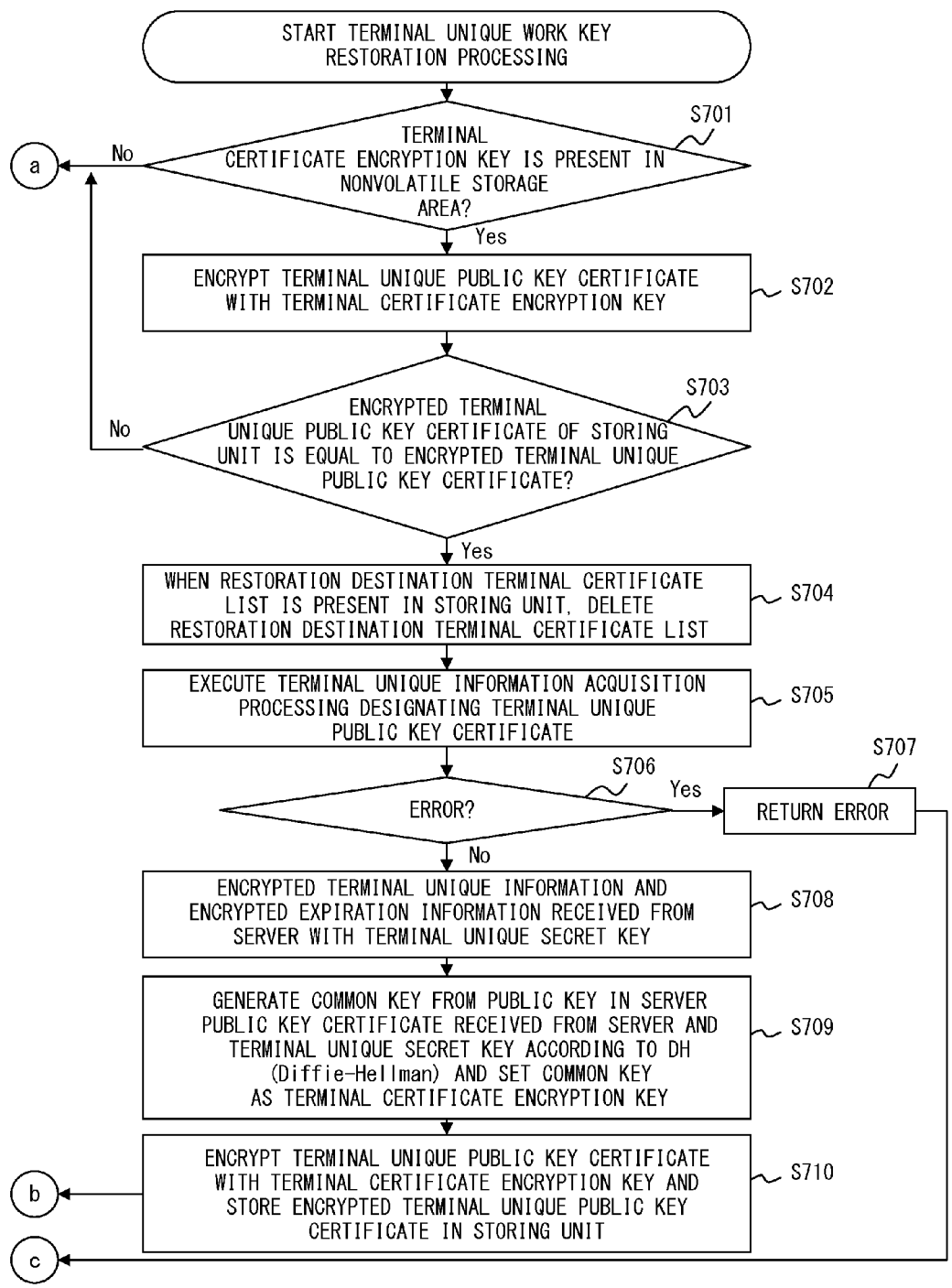
FIG. 15A is a flowchart of terminal unique work key restoration processing according to the embodiment.
Figure 15B:
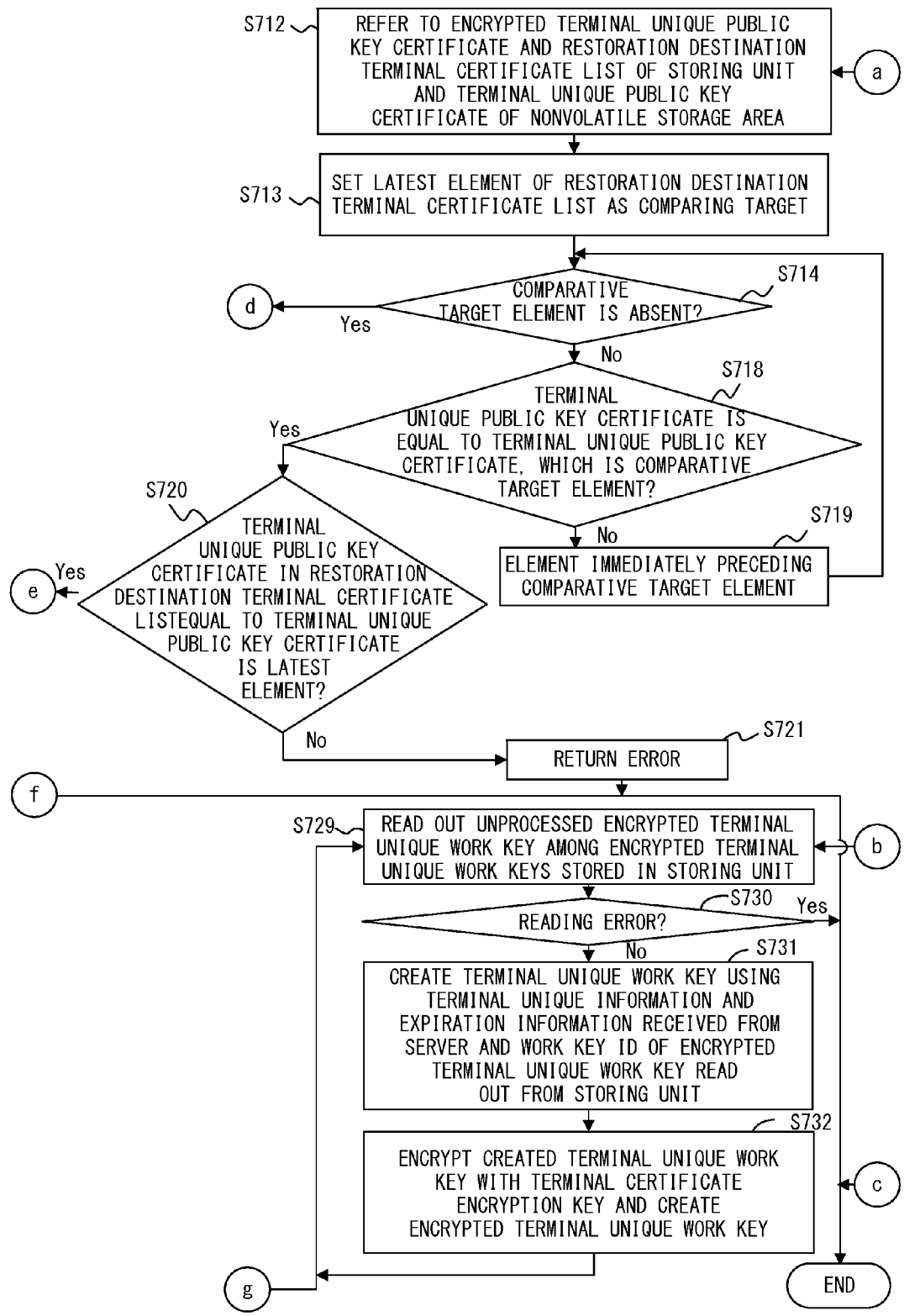
FIG. 15B is a flowchart of the terminal unique work key restoration processing according to the embodiment.
Figure 15C:
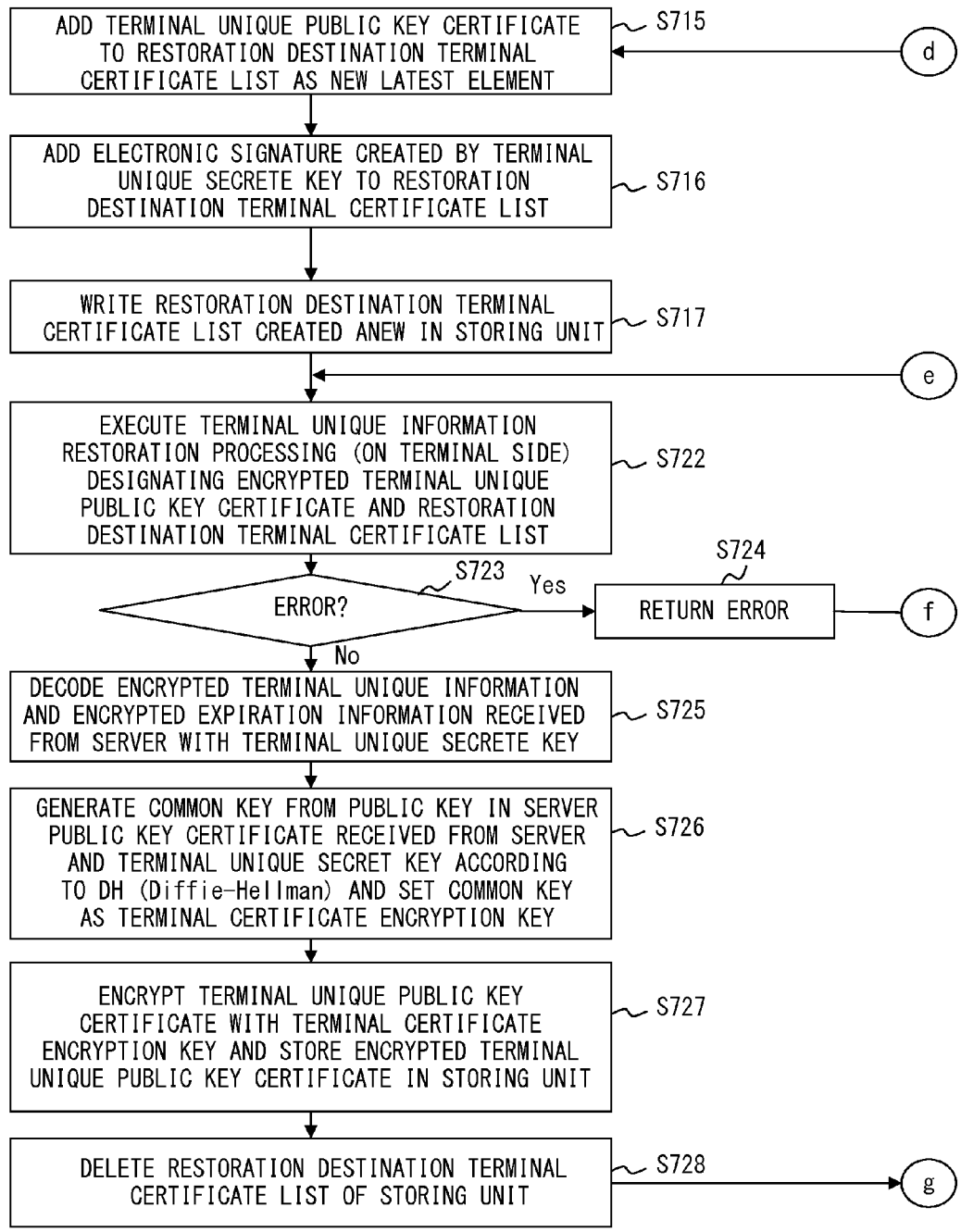
FIG. 15C is a flowchart of the terminal unique work key restoration processing according to the embodiment.

FIGS. 15A, 15B, and 15C are flowcharts of the terminal unique work key restoration processing according to the embodiment.

In step S701, the terminal-unique-work-key restoring unit 231 checks whether the terminal certificate encryption key 285 is present in the nonvolatile storage area 281. When the terminal certificate encryption key 285 is present, the control proceeds to step S702. When the terminal certificate encryption key 285 is absent, the control proceeds to step S712.

In step S702, the terminal-certificate encrypting unit 236 encrypts the terminal unique public key certificate 284 using the terminal certificate encryption key 285 and generates an encrypted terminal unique public key certificate.

In step S703, the terminal-unique-work-key restoring unit 231 determines whether the encrypted terminal unique public key certificate 292 stored in the storing unit 291 and the encrypted terminal unique public key certificate generated in step S702 are equal. When the encrypted terminal unique public key certificate 292 and the encrypted terminal unique public key certificate generated in step S702 are equal, the control proceeds to step S704. When the encrypted terminal unique public key certificate 292 and the encrypted terminal unique public key certificate generated in step S702 are not equal, the control proceeds to step S712.

In step S704, the terminal-unique-work-key restoring unit 231 checks whether the restoration destination terminal certificate list 296 is present in the storing unit 291. When the restoration destination terminal certificate list 296 is present in the storing unit 291, the terminal-unique-work-key restoring unit 231 deletes the restoration destination terminal certificate list 296.

In step S705, the terminal-unique-information-acquisition processing unit 212 executes the terminal unique information acquisition processing designating the terminal unique public key certificate.

In step S706, when an error is returned in the terminal unique information acquisition processing, the control proceeds to step S707. When an error is not returned, the control proceeds to step S708.

In step S707, the terminal-unique-work-key generating unit 211 returns an error.

In step S708, the terminal-unique-work-key-generation processing unit 233 decodes, using the terminal unique secret key 283, encrypted terminal unique information 240 and encrypted expiration information 241 received from the server 301 by the terminal unique information acquisition processing.

In step S709, the terminal-certificate-encryption-key generating unit 234 generates a common key from a public key in a server public key certificate received from the server 301 and the terminal unique secret key 283 according to the Diffie-Hellman (DH) system. The terminal-certificate-encryption-key generating unit 234 stores the common key in the nonvolatile storage area 281 as the terminal certificate encryption key 285.

In step S710, the terminal-certificate encrypting unit 236 encrypts the terminal unique public key certificate 284 using the terminal certificate encryption key 285 and stores the encrypted terminal unique public key certificate 292 in the storing unit 291.

In step S712, the terminal-unique-work-key restoring unit 231 refers to the encrypted terminal unique public key certificate 292 and the restoration destination terminal certificate list 296 stored in the storing unit 291 and the terminal unique public key certificate 284 stored in the nonvolatile storage area 281.

In step S713, the terminal-unique-work-key restoring unit 231 sets a latest element of the restoration destination terminal certificate list 296 as a comparing target. The latest element of the restoration destination terminal certificate list 296 is a terminal unique public key certificate described in the end (the tail) among the terminal unique public key certificate included in the restoration destination terminal certificate list 296. The element (the terminal unique public key certificate) set as the comparing target is referred to as comparing target element.

In step S714, when an element to be set as the comparing target is absent, the control proceeds to step S715. When an element to be set as the comparing target is present, the control proceeds to step S718.

In step S715, the terminal-unique-work-key restoring unit 231 adds (describes) the terminal unique public key certificate 284 at the tail of terminal unique public key certificates of the restoration destination terminal certificate list 296. The terminal unique public key certificate 284 described anew is the latest element.

In step S716, the terminal-unique-work-key restoring unit 231 creates an electronic signature created using the terminal unique secret key 283 and adds the electronic signature to the restoration destination terminal certificate list 296. Note that an old electronic signature is overwritten by a new electronic signature.

In step S717, the terminal-unique-work-key restoring unit 231 writes the restoration destination terminal certificate 296 generated anew in the storing unit 291.

Restoration destination terminal certificate lists before execution (before update) and after execution (after update) of steps S715 to S717 are explained.

Figure 16:
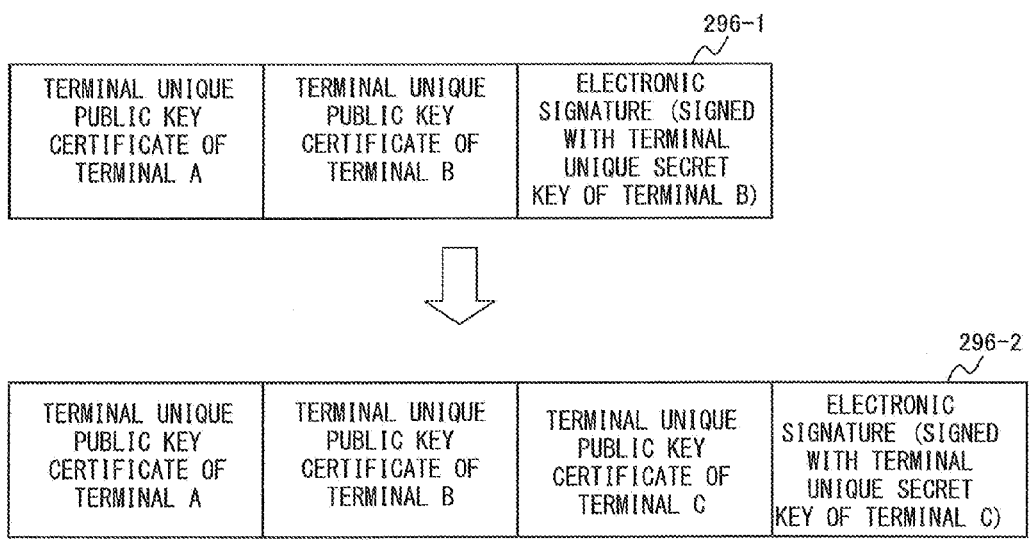
FIG. 16 is an example of restoration destination terminal certificate lists before update and after update.

FIG. 16 is an example of restoration destination terminal certificate lists before update and after update.

It is assumed that the terminal unique work key restoration processing is performed by a terminal C.

A restoration destination terminal certificate list 296-1 before update is the same as the restoration destination terminal certificate list 296 explained with reference to FIG. 14.

A restoration destination terminal certificate list 296-2 (after update) generated anew includes terminal unique public key certificates of the terminals A, B, and C and an electronic signature signed on terminal unique key certificates of the terminals A, B, and C with a terminal unique secret key of the terminal C.

That is, in the restoration destination terminal certificate list 296-2 after update, the terminal unique public key certificate of the terminal C is described after the terminal unique public key certificate of the terminal B of the restoration destination terminal certificate list 296-1 before update and the electronic signature signed on the terminal unique key certificates of the terminals A, B, and C with the terminal unique secret key of the terminal C is described after the terminal unique public key certificate of the terminal C.

In step S718, the terminal-unique-work-key restoring unit 231 determines whether the terminal unique public key certificate 284 of the nonvolatile storage area 281 and the terminal unique public key certificate set as the comparing target are equal. When the terminal unique public key certificate 284 of the nonvolatile storage area 281 and the terminal unique public key certificate set as the comparing target are equal, the control proceeds to step S720. When the terminal unique public key certificate 284 of the nonvolatile storage area 281 and the terminal unique public key certificate set as the comparing target are not equal, the control proceeds to step S719.

In step S719, the terminal-unique-work-key restoring unit 231 sets an element immediately preceding the comparing target element as a new comparing target.

In step S720, the terminal-unique-work-key restoring unit 231 determines whether a terminal unique public key certificate in the restoration destination terminal certificate list 296 equal to the terminal unique public key certificate 284 is the latest element. When the terminal unique public key certificate in the restoration destination terminal certificate list 296 equal to the terminal unique public key certificate 284 is the latest element, the control proceeds to step S722. When the terminal unique public key certificate in the restoration destination terminal certificate list 296 equal to the terminal unique public key certificate 284 is not the latest element, the control proceeds to step S721.

In step S721, the terminal-unique-work-key restoring unit 231 returns an error. In this way, when the terminal performed the terminal unique work key restoration processing before and the terminal unique work key is already restored in another terminal, an error occurs.

In step S722, the terminal-unique-information-restoration processing unit 232 executes the terminal unique information restoration processing designating the encrypted terminal unique public key certificate 292 and the restoration destination terminal certificate list 296. Details of the terminal unique information restoration processing (on the terminal side) are explained below.

In step S723, when an error is returned in the terminal unique information restoration processing (on the terminal side), the control proceeds to step S724. When the error is not returned in the terminal unique information restoration processing (on the terminal side), the control proceeds to step S725.

In step S724, the terminal-unique-information-restoration processing unit 232 returns an error.

In step S725, the terminal-unique-work-key restoring unit 231 decodes the encrypted terminal unique information 240 and the encrypted expiration information 241 received from the server 301 using the terminal unique secret key 283.

In step S726, the terminal-certificate-encryption-key generating unit 234 generates a common key from a public key in the server public key certificate 239 received from the server 301 and the terminal unique secret key 283 according to the Diffie-Hellman (DH) system. The terminal-certificate-encryption-key generating unit 234 stores the common key in the nonvolatile storage area 281 as the terminal certificate encryption key 285.

In step S727, the terminal-certificate encrypting unit 236 encrypts the terminal unique public key certificate 284 using the terminal certificate encryption key 285 and stores the encrypted terminal unique public key certificate 292 in the storing unit 291.

In step S728, the terminal-unique-work-key restoring unit 231 deletes the restoration destination terminal certificate list 296 stored in the storing unit 291.

In step S729, the terminal-unique-work-key restoring unit 231 reads one unprocessed encrypted terminal unique work key 293 (not overwritten in step S732) among encrypted terminal unique work keys 293 stored in the storing unit 291.

In step S730, when a reading error occurs (i.e., when the unprocessed encrypted terminal unique work key 293 is absent), the processing is ended. When a reading error does not occur, the control proceeds to step S731.

In step S731, the terminal-unique-work-key-generation processing unit 233 creates the terminal unique work key 242 using the terminal unique information and the expiration information received from the server 301 and the work key ID of the encrypted terminal unique work key 293 read out from the storing unit 291.

In step S732, the terminal-unique-work-key encrypting unit 235 encrypts the created terminal unique work key 242 using the terminal certificate encryption key 285 and creates an encrypted terminal unique work key 293. The terminal-unique-work-key encrypting unit 235 overwrites the created encrypted terminal unique work key on the encrypted terminal work key 293 stored in the storing unit 291 indicated by the work key ID of the encrypted terminal unique work key 293 read out from the storing unit 291.

FIG. 17 is a flowchart of the terminal unique information restoration processing (on the terminal side) according to the embodiment.

The flowchart of FIG. 17 corresponds to step S722 in FIG. 15C.

In step S741, the terminal-unique-information-restoration processing unit 232 reads out the terminal unique public key certificate 284 from the nonvolatile storage area 281.

In step S742, the terminal-unique-information-restoration processing unit 232 transmits a server public key certificate acquisition request to the server 301 designating the terminal unique public key certificate 284.

In step S743, when the terminal-unique-information-restoration processing unit 232 receives an error response from the server 301, the control proceeds to step S744. When the terminal-unique-information-restoration processing unit 232 does not receive the error response from the server 301, the control proceeds to step S745.

In step S744, the terminal-unique-information-restoration processing unit 232 returns an error.

In step S745, the terminal-unique-information-restoration processing unit 232 decodes an encrypted server public key certificate received from the server 301 using the terminal unique secret key 283 and acquires the server public key certificate 239.

In step S746, the terminal-unique-information-restoration processing unit 232 encrypts user authentication information 247 using the public key of the server public key certificate 239 and creates a one-time password acquisition request. The one-time password acquisition request includes the encrypted user authentication information 247. Note that the user authentication information 247 to be used is designated as an input parameter at the start of the processing.

In step S747, the terminal-unique-information-restoration processing unit 232 transmits the one-time password acquisition request to the server 301.

In step S748, when the terminal-unique-information-restoration processing unit 232 receives an error response from the server 301, the control proceeds to step S749. When the terminal-unique-information-restoration processing unit 232 does not receive the error response, the control proceeds to step S750.

In step S749, the terminal-unique-information-restoration processing unit 232 returns an error.

In step S750, the terminal-unique-information-restoration processing unit 232 receives an encrypted one-time password from the server 301.

In step S751, the terminal-unique-information-restoration processing unit 232 decodes the encrypted one-time password using the terminal unique secret key 283 and acquires a one-time password.

In step S752, the restoration-request generating unit 237 encrypts the one-time password, the encrypted terminal unique public key certificate 292, and the restoration destination terminal certificate list 296 using the public key of the server public key certificate 239 and creates the terminal unique information restoration request 243.

In step S753, the terminal-unique-information-restoration processing unit 232 transmits the terminal unique information restoration request 243 to the server 301.

In step S754, when the terminal-unique-information-restoration processing unit 232 receives an error response from the server 301, the control proceeds to step S755. When the terminal-unique-information-restoration processing unit 232 does not receive the error response, the control proceeds to step S756.

In step S755, the terminal-unique-information-restoration processing unit 232 returns an error.

In step S756, the terminal-unique-information-restoration processing unit 232 receives the encrypted terminal unique information 240 and the encrypted expiration information 241 from the server 301.

Processing (terminal unique information restoration request reception processing) on the server side during the terminal unique information restoration processing (on the terminal side) is explained.

Figure 18:
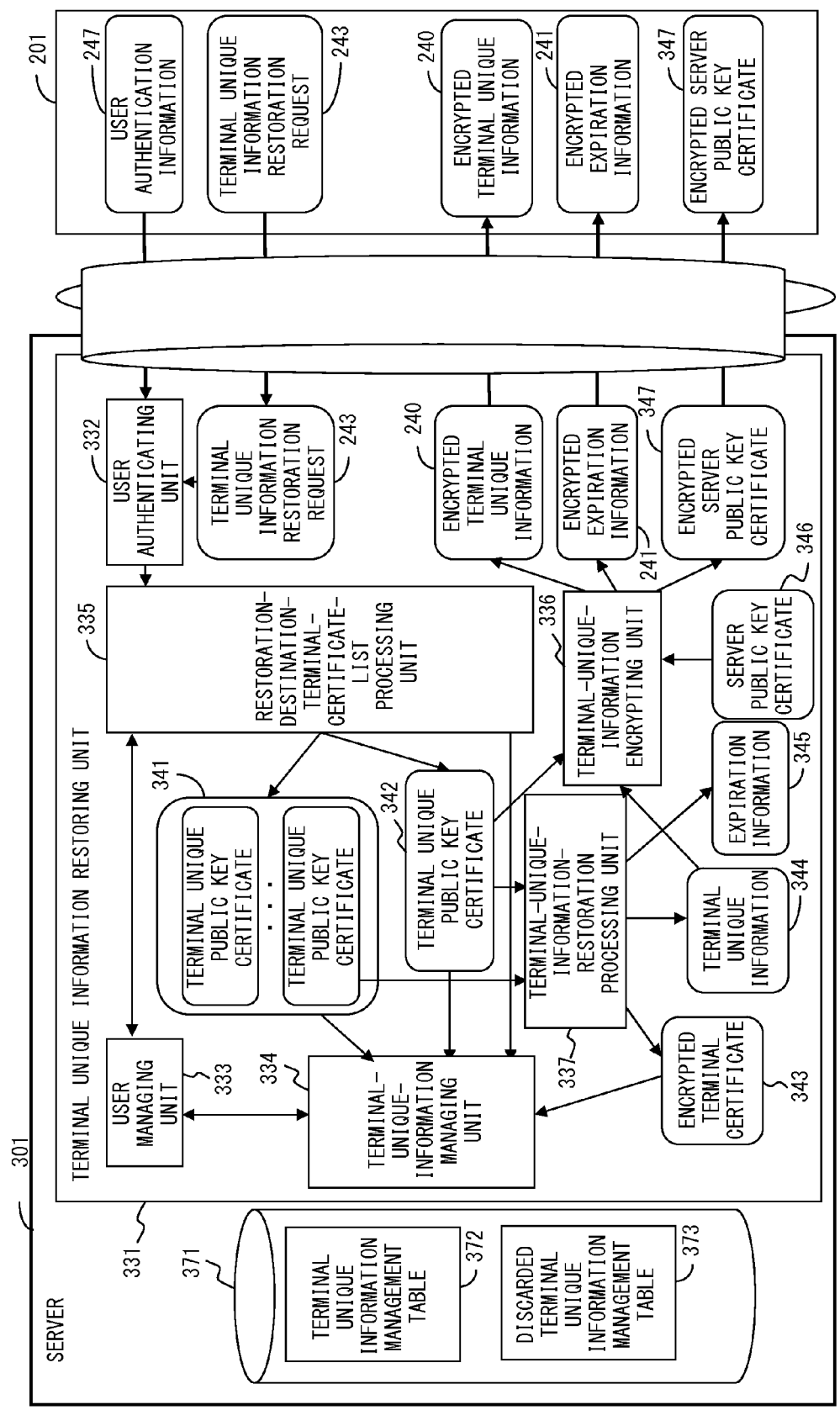
FIG. 18 is a detailed configuration diagram of the server according to the embodiment.

FIG. 18 is a detailed configuration diagram of the server according to the embodiment.

In FIG. 18, components related to the terminal unique information restoration request reception processing are depicted. The other components or the components explained above are not illustrated.

The terminal-unique-information restoring unit 331 includes a user authenticating unit 332, a user managing unit 333, a terminal-unique-information managing unit 334, a restoration-destination-terminal-certificate-list processing unit 335, a terminal-unique-information encrypting unit 336, and a terminal-unique-information-restoration processing unit 337.

The user authenticating unit 332 decoded the encrypted user authentication information 247, terminal unique information restoration request 243, and the like.

The user managing unit 333 performs user authentication.

The terminal-unique-information managing unit 334 performs, for example, writing data in and deleting data from the terminal unique information management table 372 and the discarded terminal unique information management table 373.

The restoration-destination-terminal-certificate-list processing unit 335 extracts and outputs a terminal unique public key certificate 341 in a restoration destination terminal certificate list. The restoration-destination-terminal-certificate-list processing unit 335 decodes an encrypted terminal unique public key certificate and outputs a terminal unique public key certificate 342.

The terminal-unique-information encrypting unit 336 encrypts terminal unique information 344, expiration information 345, and a server public key certificate 346 and outputs the encrypted terminal unique information 240, the encrypted expiration information 241, and an encrypted server public key certificate 347.

The terminal-unique-information-restoration processing unit 337 performs terminal unique information restoration processing (on a server side).

Figure 19:
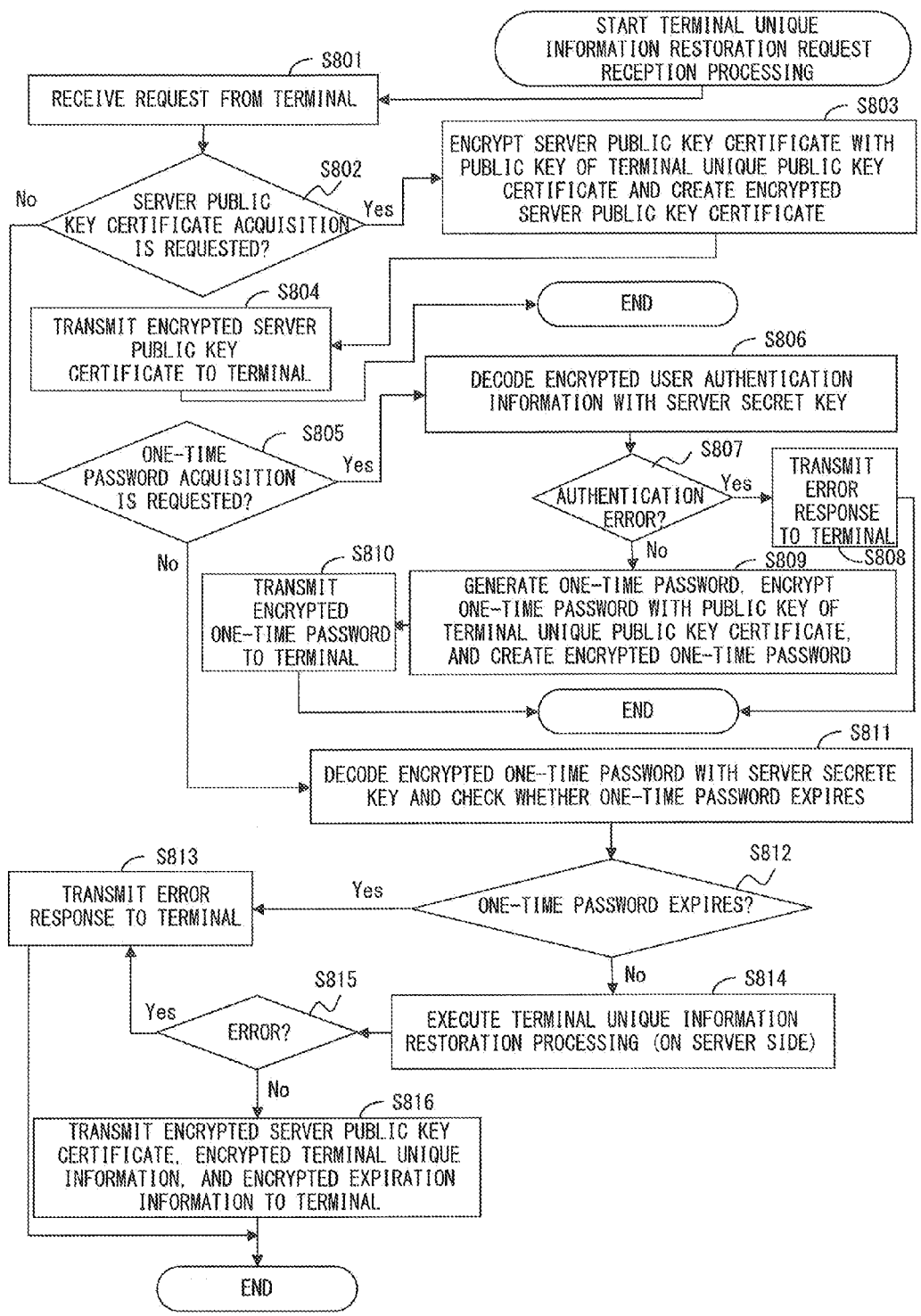
FIG. 19 is a flowchart of terminal unique information restoration request reception processing according to the embodiment.

FIG. 19 is a flowchart of the terminal unique information restoration request reception processing according to the embodiment.

In step S801, the terminal-unique-information restoring unit 331 receives a request from the terminal 201.

In step S802, the terminal-unique-information restoring unit 331 determines whether the request is a server public key certificate acquisition request. When the request is the server public key certificate acquisition request, the control proceeds to step S803. When the request is not the server public key certificate acquisition request, the control proceeds to step S805.

In step S803, the terminal-unique-information encrypting unit 336 encrypts the server public key certificate 346 with a public key of a terminal unique public key certificate designated by the server public key certificate acquisition request and creates the encrypted server public key certificate 347.

In step S804, terminal-unique-information encrypting unit 336 transmits the encrypted server public key certificate 347 to the terminal 201.

In step S805, the terminal-unique-information restoring unit 331 determines whether the request is a one-time password acquisition request. When the request is the one-time password acquisition request, the control proceeds to step S806. When the request is not the one-time password acquisition request, the control proceeds to step S811. Note that, when the request is not the one-time password acquisition request, the request received from the terminal is a terminal unique information restoration request.

In step S806, the user authenticating unit 332 decodes encrypted user authentication information included in the one-time password acquisition request using a server secret key.

In step S807, the user managing unit 333 checks user authentication information and performs user authentication. When the user authentication is an error, the control proceeds to step S808. When the user authentication is not an error, the control proceeds to step S809.

In step S808, the terminal-unique-information restoring unit 331 transmits an error response to the terminal 201.

In step S809, the terminal-unique-information restoring unit 331 generates a one-time password, encrypts the one-time password with the public key of the terminal unique public key certificate, and creates an encrypted one-time password.

In step S810, the terminal-unique-information restoring unit 331 transmits the encrypted one-time password to the terminal 201.

In step S811, the user authenticating unit 332 decodes the encrypted one-time password included in the terminal unique information restoration request using the server secret key and checks whether the one-time password expires. The user authenticating unit 332 decodes the encrypted terminal unique public key certificate 292 and the encrypted restoration destination terminal certificate list 296 included in the terminal unique information restoration request using the server secret key and acquires the encrypted terminal unique public key certificate 292 and the restoration destination terminal certificate list 296. Note that the encrypted terminal unique public key certificate 292 and the restoration destination terminal certificate list 296 are used in terminal unique information restoration processing (on the server side) (step S814) (on the server side) explained below.

In step S812, when the one-time password expires, the control proceeds to step S813. When the one-time password does not expire, the control proceeds to step S814.

In step S813, the terminal-unique-information restoring unit 331 transmits an error response to the terminal 201.

In step S814, the terminal-unique-information-restoration processing unit 337 executes the terminal unique information restoration processing (on the server side). Details of the terminal unique information restoration processing (on the server side) are explained below.

In step S815, when an error is returned in the terminal unique information restoration processing, the control proceeds to step S813. When an error is not returned in the terminal unique information restoration processing, the control proceeds to step S816.

In step S816, the terminal-unique-information encrypting unit 336 transmits an encrypted server public key certificate, encrypted terminal unique information, and encrypted expiration information to the terminal 201.

Figure 20:
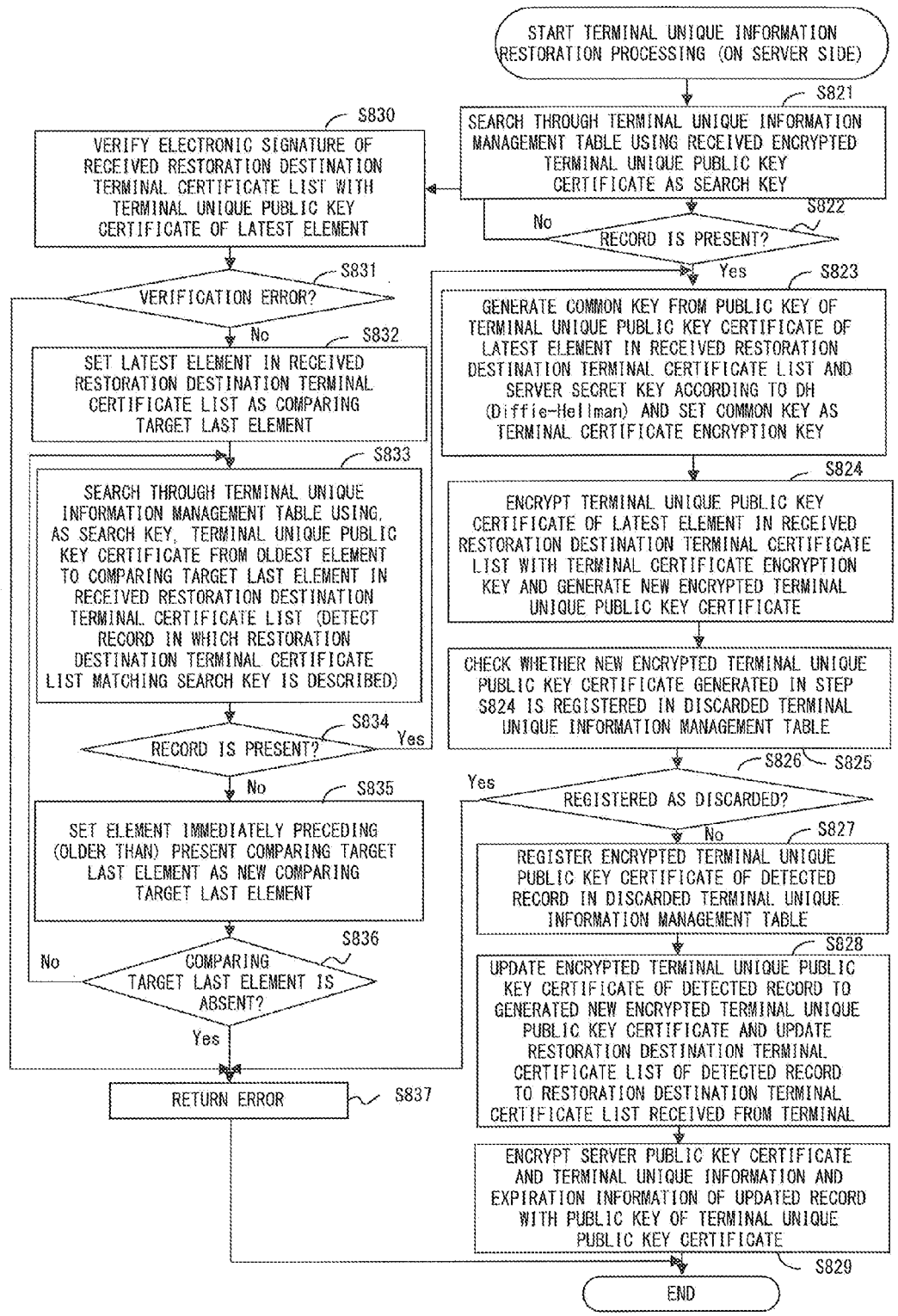
FIG. 20 is a flowchart of terminal unique information restoration processing (on a server side) according to the embodiment.

FIG. 20 is a flowchart of the terminal unique information restoration processing (on the server side) according to the embodiment.

The flowchart of FIG. 20 corresponds to step S814 in FIG. 19.

In step S821, the terminal-unique-information-restoration processing unit 337 searches through the terminal unique information management table 372 using, as a search key, the encrypted terminal unique public key certificate received from the terminal 201.

In step S822, when a record matching the search key is present in the terminal unique information management table 372, the control proceeds to step S823. When a record matching the search key is absent in the terminal unique information management table 372, the control proceeds to step S830. Note that the record matching the search key detected by the search is referred to as detected record.

In step S823, the terminal-unique-information-restoration processing unit 337 generates a common key from a public key of a terminal unique public key certificate, which is the latest element, among terminal unique public key certificates included in the restoration destination terminal certificate list 296 received from the terminal 201 and the server secret key according to the Diffie-Hellman (DH) system. The terminal-unique-information-restoration processing unit 337 sets the generated common key as a terminal certificate encryption key.

In step S824, the terminal-unique-information-restoration processing unit 337 encrypts the terminal unique public key certificate, which is the latest element, among the terminal unique public key certificates included in the restoration destination terminal certificate list 296 received from the terminal 201 using the terminal certificate encryption key generated in step S823 and generates a new encrypted terminal unique public key certificate.

In step S825, the terminal-unique-information-restoration processing unit 337 checks whether the new encrypted terminal unique public key certificate generated in step S824 is registered in the discarded terminal unique information management table 373.

In step S826, when the new encrypted terminal unique public key certificate is registered in the discarded terminal unique information management table, the control proceeds to step S837. When the new encrypted terminal unique public key certificate is not registered in the discarded terminal unique information management table, the control proceeds to step S827.

In step S827, the terminal-unique-information-restoration processing unit 337 registers the encrypted terminal unique public key certificate of the detected record in the discarded terminal unique information management table 373.

In step S828, the terminal-unique-information-restoration processing unit 337 updates the encrypted terminal unique public key certificate of the detected record to the new encrypted terminal unique public key certificate generated in step S824. Further, the terminal-unique-information-restoration processing unit 337 updates the restoration destination terminal certificate list of the detected record to the restoration destination terminal certificate list 296 received from the terminal 201.

In step S829, the terminal-unique-information encrypting unit 336 encrypts the server public key certificate 346 and the terminal unique information and the expiration information of the record updated in step S828 using the public key of the terminal unique public key certificate 342 and generates the encrypted server public key certificate 347, the encrypted terminal unique information 240, and the encrypted expiration information 241.

In step S830, the terminal-unique-information-restoration processing unit 337 verifies the electronic signature included in the restoration destination terminal certificate list 296 received from the terminal 201 using the terminal unique public key certificate, which is the latest element, of the restoration destination terminal certificate list 296.

In step S831, when a verification error occurs, the control proceeds to step S837. When the verification error does not occur, the control proceeds to step S832.

In step S832, the terminal-unique-information-restoration processing unit 337 sets, as a comparing target last element, the latest element of the terminal unique public key certificate of the restoration destination terminal certificate list 296 received from the terminal 201. The latest element of the restoration target terminal certificate list 296 is the terminal unique public key certificate described in the end (the tail) among the terminal unique public key certificates included in the restoration destination terminal certificate list 296.

In step S833, the terminal-unique-information-restoration processing unit 337 searches through the terminal unique information management table 372 using, as a search key, the terminal unique public key certificates from the oldest (the head) element to the comparing target last element in the restoration destination terminal certificate list 296 received from the terminal 201. The terminal-unique-information-restoration processing unit 337 detects a record in which a restoration destination terminal certificate list matching the search key is described.

In step S834, when the record matching the search key is present in the terminal unique information management table 372, the control proceeds to step S823. When the record matching the search key is absent in the terminal unique information management table 372, the control proceeds to step S825. Note that the record matching the search key detected by the search is referred to as detected record.

In step S835, the terminal-unique-information-restoration processing unit 337 sets an element immediately preceding (older than) the present comparing target last element as a new comparing target last element.

In step S836, when the near comparing target last element is set, the control returns to step S833. When the new comparing target last element is not set (i.e., when the comparing target last element is the head element), the control proceeds to step S837.

In step S837, the terminal-unique-information-restoration processing unit 337 returns an error.

With the system in the embodiment, it is possible to suppress terminals capable of using stored data from fraudulently increasing.

With the system in the embodiment, when the terminal unique work key restoration processing is performed, even if a terminal is broken during restoration of a terminal unique work key, by checking the restoration destination terminal certificate list, it is possible to determine whether the restoration processing may be performed in a combination of data at an update source and a terminal at an update destination. Therefore, it is possible to suppress a right of restoration from being unduly lost.

FIG. 21 is a configuration diagram of an information processing apparatus (a computer).

The terminal 201 and the server 301 in the embodiment are realized by, for example, an information processing apparatus 1 depicted in FIG. 21.

The information processing apparatus 1 includes a CPU 2, a memory 3, an input unit 4, an output unit 5, a storing unit 6, a recording-medium driving unit 7, and a network connection unit 8, which are connected to one another by a bus 9.

The CPU 2 is a central processing unit that controls the entire information processing apparatus 1. The CPU 2 corresponds to the terminal-unique-work-key generating unit 211, the terminal-unique-work-key restoring unit 231, the IP-broadcast processing unit 251, the stored-data decoding unit 271, the replaying processing unit 299, the terminal-unique-information delivering unit 311, the terminal-unique-information restoring unit 331, the work-key delivering unit 351, and the broadcast-data delivering unit 361.

The memory 3 is a memory such as a read only memory (ROM) or a random access memory (RAM) that temporarily stores, in program execution, a program or data stored in the storing unit 6 (or a portable recording medium 10). The CPU 2 executes the program using the memory 3 to thereby execute the various kinds of processing explained above.

In this case, a program code itself read out from the portable recording medium or the like realizes the functions in the embodiment.

The input unit 4 is, for example, a keyboard, a mouse, or a touch panel.

The output unit 5 is, for example, a display or a printer.

The storing unit 6 is, for example, a magnetic disk device, an optical disk device, or a tape device. The information processing apparatus 1 stores the program and the data in the storing unit 6 and reads out the program and the data to the memory 3 and uses the program and the data.

The memory 3 or the storing unit 6 correspond to the nonvolatile storage area 281 and the storing units 291 and 371.

The recording-medium driving unit 7 drives the portable recording medium 10 and accesses recorded contents of the portable recording medium 10. As the portable recording medium, any computer-readable recording medium such as a memory card, a flexible disk, a compact disk read only memory (CD-ROM), an optical disk, or a magneto-optical disk is used. The user stores the program and the data on the portable recording medium 10 and reads out the program and the data to the memory 3 and uses the program and the data.

The network connection unit 8 is connected to any communication network such as a LAN and performs data conversion involved in communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A terminal unique information transmission method comprising:
    receiving, by a server, from a terminal, a terminal unique information acquisition request including a terminal unique public key certificate of the terminal;
    generating an encrypted terminal unique public key certificate by encrypting the terminal unique public key certificate of the terminal;
    checking, by the server, whether the generated encrypted terminal unique public key certificate is described in a discarded terminal information table;
    transmitting, by the server, when the generated encrypted terminal unique public key certificate is not described in the discarded terminal information table, a terminal unique information of the terminal to the terminal;
    receiving, by the server, from the terminal, a terminal unique information update request including an other encrypted terminal unique public key certificate obtained by encrypting a terminal unique public key certificate of an other terminal and a restoration destination terminal certificate list in which at least the terminal unique public key certificate of the terminal is described as a latest element;
    checking, by the server, whether the other encrypted terminal unique public key certificate is described in a terminal unique information table; and
    transmitting, by the server, when the other encrypted terminal unique public key certificate is described in the terminal unique information table, the terminal unique information associated with the other encrypted terminal unique public key certificate to the terminal and describing the other encrypted terminal unique public key certificate in the discarded terminal information table.

2. The terminal unique information transmission method according to claim 1, wherein an encrypted terminal unique public key certificate of a terminal not permitted to acquire the terminal unique information is described in the discarded terminal information table.

3. The terminal unique information transmission method according to claim 1, wherein in the transmission process of the terminal unique information,
    the server refers to the terminal unique information table in which the encrypted terminal unique public key certificate and the terminal unique information are described in association with each other, checks wherein the terminal unique information associated with the generated encrypted terminal unique public key certificate is described in the terminal unique information table, transmits, when the terminal unique information is described in the terminal unique information table, the terminal unique information associated with the generated encrypted terminal unique public key certificate, and generates, when the terminal unique information is not described in the terminal unique information table, the terminal unique information using the terminal unique public key certificate of the terminal and transmits the terminal unique information.

4. The terminal unique information transmission method according to claim 1, wherein in the terminal unique information table,
    an other restoration destination terminal certificate list in which the terminal unique public key certificate is described is further described in association with the encrypted terminal unique public key certificate and the terminal unique information, and
    when the other encrypted terminal unique public key certificate is not described in the terminal unique information table,
    the server searches through the terminal unique information table using, as a search key, a head element to any element of the restoration destination terminal certificate list included in the terminal unique information update request, when a record including the other restoration destination terminal certificate list matching the search key is detected, transmits the terminal unique information of the detected record to the terminal, and describes the encrypted terminal unique public key certificate of the detected record in the discarded terminal information table.

5. A terminal unique information transmission system comprising:
    a terminal; and
    a server, wherein
    the terminal includes:
        a first processor that encrypts a data, and transmits, during the encryption of the data, a terminal unique information acquisition request including a terminal unique public key certificate of the terminal to the server and generates a terminal unique work key using a terminal unique information received from the server; and
        a first storing unit that stores the encrypted data, and
    the server includes:
        a second storing unit that stores a discarded terminal information table; and
        a second processor that receives the terminal unique information acquisition request, generates an encrypted terminal unique public key certificate by encrypting the terminal unique public key certificate of the terminal, checks whether the generated encrypted terminal unique public key certificate is described in the discarded terminal information table, and, when the generated encrypted terminal unique public key certificate is not described in the discarded terminal information table, transmits the terminal unique information of the terminal to the terminal, the first storing unit stores an other encrypted terminal unique public key certificate obtained by encrypting a terminal unique public key certificate of an other terminal and a restoration destination terminal certificate list in which the terminal unique public key certificate are described, the first processor transmits a terminal unique information update request including the other encrypted terminal unique public key certificate and a restoration destination terminal certificate list in which the terminal unique public key certificate of the terminal is described as a latest element, generates a new terminal unique work key using the terminal unique information received from the server, encrypts the new terminal unique work key, and updates the encrypted terminal unique work key stored in the storing unit with the encrypted new terminal unique work key, and the second processor receives the terminal-unique-information updating request, checks whether the other encrypted terminal unique public key certificate is described in the terminal unique information table, and, when the other encrypted terminal unique public key certificate is described in a terminal unique information table, transmits the terminal unique information associated with the other encrypted terminal unique public key certificate to the terminal.

6. The terminal unique information transmission system according to claim 5, wherein an encrypted terminal unique public key certificate of a terminal not permitted to acquire the terminal unique information is described in the discarded terminal information table.

7. The terminal unique information transmission system according to claim 5, wherein the first processor checks expiration of the terminal unique work key during decoding of the encrypted data and, when the terminal unique work key expires, transmits the terminal unique information acquisition request.

8. The terminal unique information transmission system according to claim 5, wherein the second storing unit stores the terminal unique information table in which the encrypted terminal unique public key certificate and the terminal unique information are described in association with each other, and the second processor refers to the terminal unique information table, checks whether the terminal unique information associated with the encrypted terminal unique public key certificate of the terminal unique information acquisition request is described in the terminal unique information table, when the terminal unique information is described in the terminal unique information table, transmits the terminal unique information associated with the generated encrypted terminal unique public key certificate, and, when the terminal unique information is not described in the terminal unique information table, generates the terminal unique information using the terminal unique public key certificate of the terminal and transmits the terminal unique information.

9. The terminal unique information transmission system according to claim 5, wherein the first processor checks whether the terminal unique public key certificate of the terminal is described in the restoration destination terminal certificate list stored in the first storing unit, when the terminal unique public key certificate of the terminal is not described in the restoration destination terminal certificate list, adds the terminal unique public key certificate of the terminal to the restoration destination terminal certificate list as the latest element, and transmits a terminal unique information update request including the other encrypted terminal unique public key certificate and a restoration destination terminal certificate list in which the terminal unique public key certificate of the terminal is added as a latest element, and, when the terminal unique public key certificate of the terminal is not described in the restoration destination terminal certificate list, checks whether the latest element of the restoration target terminal certificate list matches the terminal unique public key certificate of the terminal and, when the latest element matches the terminal unique public key certificate of the terminal, transmits the terminal unique information update request including the other encrypted terminal unique public key certificate and the restoration destination terminal certificate list.

10. The terminal unique information transmission system according to claim 5, wherein in the terminal unique information table, an other restoration destination terminal certificate list in which the terminal unique public key certificate is described is further described in association with the encrypted terminal unique public key certificate and the terminal unique information, and when the other encrypted terminal unique public key certificate is not described in the terminal unique information table, the second processor searches through the terminal unique information table using, as a search key, a head element to any element of the restoration destination terminal certificate list included in the terminal unique information update request and, when a record including the other restoration destination terminal certificate list matching the search key is detected, transmits the terminal unique information of the detected record to the terminal.

* * * * *